(12) United States Patent
Happel

(10) Patent No.: US 7,061,491 B2
(45) Date of Patent: *Jun. 13, 2006

(54) METHOD FOR SOLVING FREQUENCY, FREQUENCY DISTRIBUTION AND SEQUENCE-MATCHING PROBLEMS USING MULTIDIMENSIONAL ATTRACTOR TOKENS

(75) Inventor: Kenneth M. Happel, Encinitas, CA (US)

(73) Assignee: Omnigon Technologies Ltd., Carlsbad, CA (US)

( * ) Notice: Subject to any disclaimer, the term of this patent is extended or adjusted under 35 U.S.C. 154(b) by 801 days.

This patent is subject to a terminal disclaimer.

(21) Appl. No.: 10/161,891

(22) Filed: Jun. 3, 2002

(65) Prior Publication Data

US 2004/0107059 A1   Jun. 3, 2004

(51) Int. Cl.
    *G06T 11/20* (2006.01)
(52) U.S. Cl. ..................................... 345/440
(58) Field of Classification Search ................ None
    See application file for complete search history.

(56) References Cited

U.S. PATENT DOCUMENTS

| | | | |
|---|---|---|---|
| 5,173,947 A | | 12/1992 | Chande et al. |
| 5,218,530 A | * | 6/1993 | Jastrzebski et al. ......... 382/207 |
| 5,416,848 A | * | 5/1995 | Young ......................... 382/191 |
| 5,636,297 A | | 6/1997 | Eller et al. |
| 5,768,437 A | * | 6/1998 | Monro et al. ............... 382/249 |
| 5,838,832 A | * | 11/1998 | Barnsley ..................... 382/249 |
| 5,867,603 A | * | 2/1999 | Barnsley et al. ............ 382/249 |
| 6,128,003 A | | 10/2000 | Smith et al. |
| 6,393,143 B1 | | 5/2002 | Pipitone |
| 6,393,159 B1 | | 5/2002 | Prasad et al. |
| 6,459,431 B1 | | 10/2002 | Browne et al. |
| 6,504,541 B1 | | 1/2003 | Liu et al. |
| 6,597,359 B1 | * | 7/2003 | Lathrop ....................... 345/440 |
| 6,614,428 B1 | * | 9/2003 | Lengyel ....................... 345/420 |
| 6,642,929 B1 | * | 11/2003 | Essafi et al. ................ 345/581 |
| 6,864,897 B1 | * | 3/2005 | Brand .......................... 345/582 |
| 2002/0019705 A1 | * | 2/2002 | Kauffman et al. ............ 702/19 |

OTHER PUBLICATIONS

International Search Report for international application No. PCT/US03/30454.

* cited by examiner

*Primary Examiner*—Ulka Chauhan
*Assistant Examiner*—Enrique L. Santiago
(74) *Attorney, Agent, or Firm*—Foley & Lardner LLP

(57) ABSTRACT

An improved method is provided for solving sequence matching and comparison problems using attractor-based processes to extract identity tokens that indicate sequence and subsequence symbol content and order. These attractor processes map the sequence from its original sequence representation space (OSRS) into a hierarchical multidimensional attractor space (HMAS). The HMAS can be configured to represent equivalent symbol distributions within two symbol sequences or perform exact symbol sequence matching. The mapping process results in each sequence being drawn to an attractor in the HMAS. Each attractor within the HMAS forms a unique token for a group of sequences with no overlap between the sequence groups represented by different attractors. The size of the sequence groups represented by a given attractor can be reduced from approximately half of all possible sequences to a much smaller subset of possible sequences. The mapping process is repeated for a given sequence so that tokens are created for the whole sequence and a series of subsequences created by repeatedly removing a symbol from the one end of sequence and then repeating the process from the other end. The resulting string of tokens represents the exact identity of the whole sequence and all its subsequences ordered from each end.

47 Claims, 9 Drawing Sheets

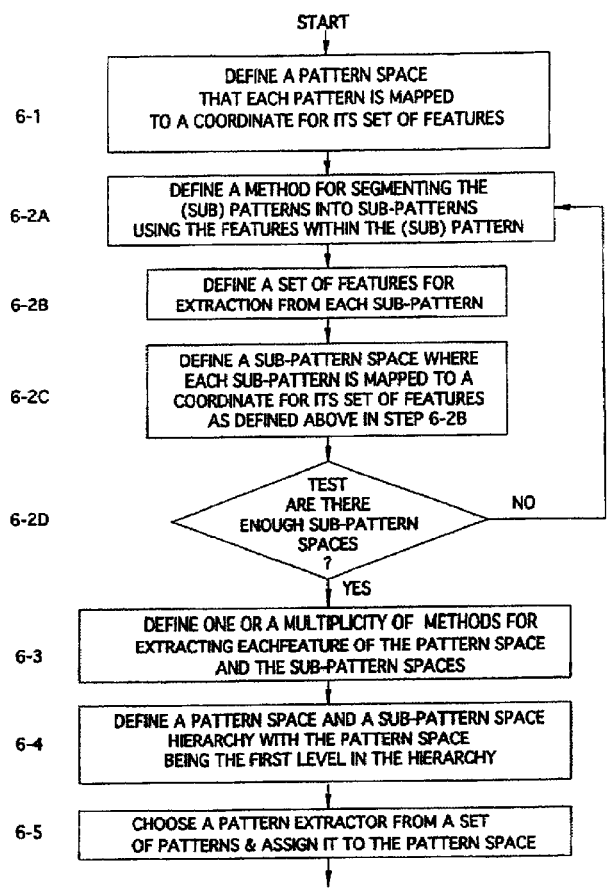
FIG. 6a   TO BLOCK 6-6 ON FIG. 6b

```
                        SEQUENCE LISTING

<160> NUMBER OF SEQ ID NOS: 2

<210> SEQ ID NO 1
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1
ggatacgtcg tataacgta                                                19

<210> SEQ ID NO 2
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
tataacgtat tagacacgg                                                19
```

METHOD FOR SOLVING FREQUENCY, FREQUENCY DISTRIBUTION AND SEQUENCE-MATCHING PROBLEMS USING MULTIDIMENSIONAL ATTRACTOR TOKENS

BACKGROUND OF THE INVENTION

1. Field of the Invention

The present invention relates to solving frequency, frequency distribution or sequence matching and comparison problems, and more particularly, to solving frequency, frequency distribution and sequence matching and comparison problems in which description of information can be represented as sequences of symbols.

2. Background Art

The following discussion of the background of the invention is merely provided to aid the reader in understanding the invention and is not admitted to describe or constitute prior art to the present invention.

Nearly all technical fields have problems involving the representation and analysis of frequencies, frequency distributions, waveforms, signal attributes or sequences. When computational devices including hardware or software are used for the analysis or control of frequencies, frequency distributions, waveforms, signal attributes or sequences, symbols (this includes pattern and pattern recognition features) are mapped to each element or sub-element of the frequency, frequency distribution, waveform, signal attribute or sequence, thereby forming a sequence of symbols that can be either inverted back to the original frequency, frequency distribution, waveform, signal attribute or sequence or used for detection, recognition, characterization, identification or description of frequency, frequency distribution, waveform, signal attribute, sequence element or sequence.

Conventional algorithms have utilized various techniques for the identification of the number of times a symbol occurs in a symbol sequence forming a symbol frequency spectrum. An unknown symbol frequency spectrum is compared to the symbol frequency spectrum obtained by such conventional algorithms, in various applications such as modal analysis of vibrations or rotational equipment, voice recognition and natural language recognition.

In many practical applications, the symbol sequences representing frequencies, frequency distributions, waveforms, signal attributes or sequences to be matched may have regions or embedded sections with full or partial symbol sequence overlaps or may have missing or extra symbols or symbol sequence elements within one or both of their representative symbol sequences. Furthermore, the sets of symbols representing each frequency, frequency distribution, waveform, signal attribute or sequence or their sub-frequency, sub-frequency distribution, sub-waveform, signal sub-attribute or subsequence may have dissimilar elements in whole or in part.

The frequency, frequency distribution, waveform, signal attribute or sequence features to be correlated are distances, distance distributions or sets of distance distributions in the frequency, frequency distribution, waveform, signal attribute or sequence which must be discovered, detected, recognized, identified or correlated. Furthermore, in many situations, symbols in such a symbol description of frequency, frequency distribution, waveform, signal attribute or sequence typically have no known meta-meaning to allow the use of a priori statistical or other pattern knowledge to identify the significance other than the to be discovered, detected, recognized, identified or correlated frequency, frequency distribution, waveform, signal attribute or sequence themselves. A whole but unknown frequency, frequency distribution, waveform, signal attribute or sequence may be assembled from frequency, frequency distribution, waveform, signal attribute or sequence fragments which may or may not include errors in the frequency, frequency distribution, waveform, signal attribute or sequence fragments.

An unknown frequency, frequency distribution, waveform, signal attribute or sequence being assembled from fragments may have repetitive symbol sequence or symbol subsequence patterns that require recognition and may create ambiguity in assembly processes. Such ambiguity results in many types of assembly errors. Such errors may occur during the assembly of a frequency description, frequency distribution, waveform, signal attribute or sequence of wrong length due to the miss-mapping of two copies of a repeating pattern or group of repeating sub-patterns which were in different places in an unknown symbol sequence to the same position in the assembled symbol sequence. Furthermore, waveform, signal attribute or sequences may have features and feature relationships that need be discovered, indexed, classified, or correlated and then applied to the evaluation of other waveform, signal attribute or sequences.

Conventional algorithms for these types of activities usually involve the evaluation of heuristic statements or iterative or recursive searching, pattern detection, matching, recognition, identification, or correlation algorithms that can be combinatorially explosive processes, thereby requiring massive numbers of CPU cycles and huge memory or storage capacity to accomplish very simple problems.

The previously mentioned combinatorial explosion occurs because finding a specific leaf at the end of a sequence of branches from the trunk of a tree without some prior knowledge of where the right leaf may be, may require that every possible combination of trunk-(branch-sequence)-leaf be followed before the path to the right leaf is found.

In many scientific, engineering and commercial applications, the presence of ambiguity and errors makes the results unreliable, unverifiable, or makes algorithms themselves unstable or inapplicable. Efforts to mitigate these problems have centered on the restriction of the scope of heuristic evaluation and pattern algorithms by building a fixed classification structure and working from a proposed answer (the leaf) back to the original waveform, signal attribute or sequence expression (the trunk). This approach is called "backwards chaining."

This approach works where the whole field of possible patterns and relationships has been exhaustively and mathematically completely defined (you can backward chain from the right leaf to the trunk if the right leaf is not part of the model). If any element is missing, it cannot be evaluated or returned by execution of the pattern algorithms. This problem is known as the "frame problem" that causes execution errors or failure of algorithms to satisfy their intended function. One result is that many software algorithms that have been developed are found to be unusable or impractical in many applications.

The current state of the art typically involves strategies for limiting the effect or scope of these combinatorially explosive behaviors by the development of vastly more powerful computational platforms, ever more expensive system architectures and configurations, and restriction of software algorithms to simple problems or projects which can afford the time and cost of use.

SUMMARY OF THE INVENTION

The above background art is intended merely as a generic description of some of the challenges encountered by data processing hardware and software when solving waveform, signal attribute or sequence-matching problems, and not as any admission of prior art.

A method of waveform, signal attribute or frequency characterization, frequency distribution characterization or matching or sequence matching according to an embodiment of the present invention includes mapping waveforms, signal attributes or sequences from an original representation space (ORS) into a hierarchical multidimensional attractor space (HMAS) to draw the waveforms, signal attributes or sequences to attractors in the HMAS, each of the attractors forms a unique token or label, repeating the step of mapping sub-waveforms, signal sub-attributes or subsequences for a given waveform, signal attribute or sequence to create a string of tokens for the given waveform, signal attribute or sequence and the sub-waveforms, signal sub-attributes or subsequences, mapping the string of tokens to create a series of spatial coordinates in a hierarchy of spaces for the given waveform, signal attribute or sequence, and evaluating waveform, signal attribute or sequence-similarity characteristics of at least two strings of tokens in the hierarchy of spaces to compare at least two of the waveforms, signal attributes or sequences. This method is also exactly applicable to the solution of frequency and frequency distribution characterization, matching and identification problems.

BRIEF DESCRIPTION OF THE DRAWINGS

FIG. 2b is a block diagram illustrating an attractor process archetype though the various spaces and processes illustrated in FIG. 2a;

FIGS. 6a and 6b are a flowchart showing a method for hierarchical pattern recognition using an attractor based characterization of feature sets.

DETAILED DESCRIPTION OF PREFERRED EMBODIMENTS

Figure 1A:
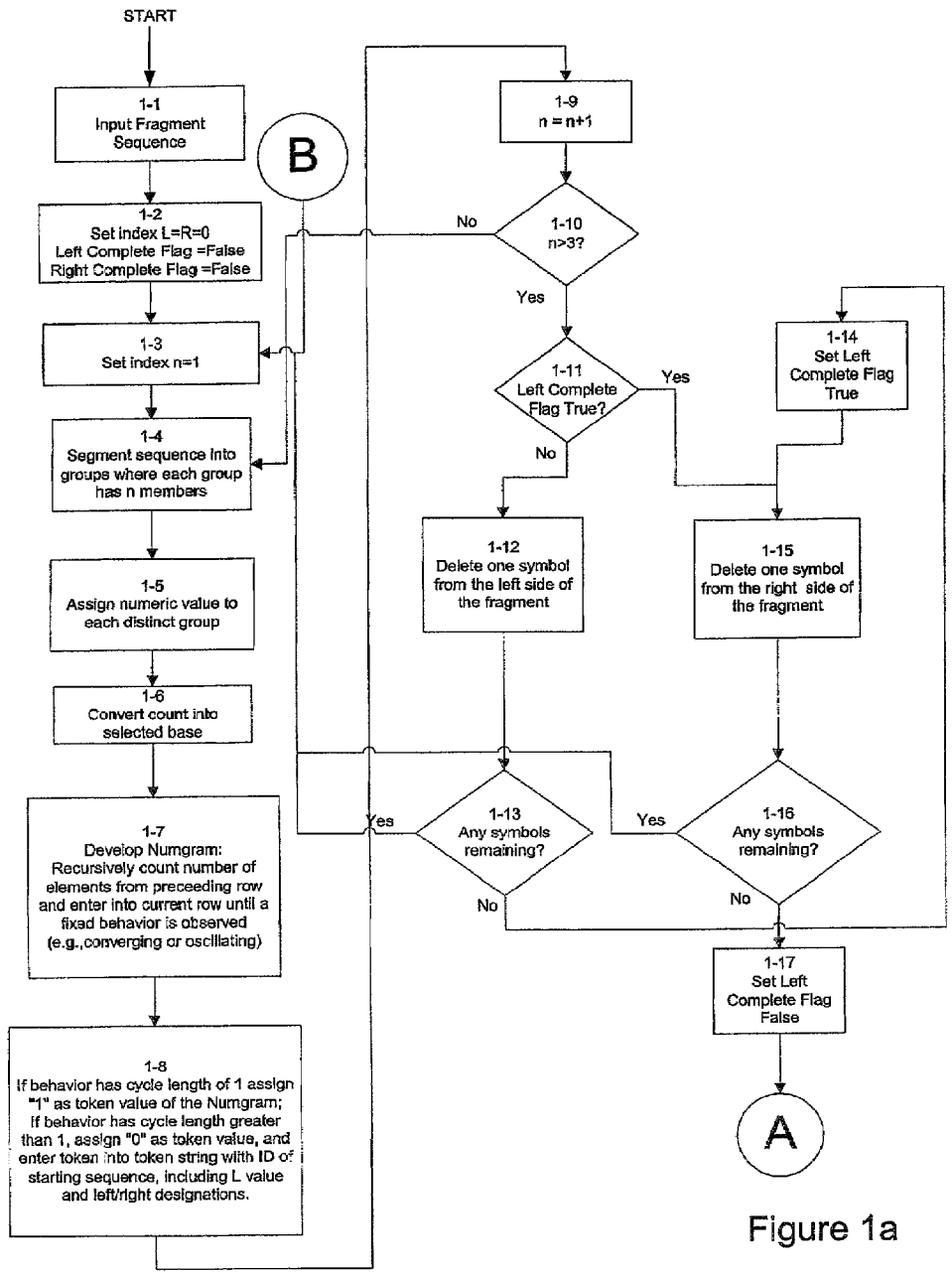
FIGS. 1a and 1b are a flowchart showing the operation of the Numgram process used to form token strings in accordance with one embodiment of an attractor process.

A method according to embodiments of the present invention is provided for creating software and hardware solutions for waveform, signal attribute or sequence-matching problems or frequency and frequency distribution problems where:

(1) the waveforms, signal attributes or sequences to be matched are exactly identical or may have missing or extra waveform, signal attribute or sequence elements within one or both waveform, signal attribute or sequences, (2) the waveform, signal attribute or sequences to be matched may have regions or embedded sections with full or partial waveform, signal attribute or sequence overlaps or may have missing or extra waveform, signal attribute or sequence elements within one or both waveform, signal attribute or sequences, (3) the symbols in each waveform, signal attribute or sequence description are all or in-part dissimilar sets, (4) the symbols composing the waveform, signal attribute or sequence have no meta-meaning allowing the use of a priori statistical or other pattern knowledge to identify the significance other than the two waveforms, signal attributes or sequences themselves, (5) unknown sequences are being reconstructed from waveform, signal attribute or sequence fragments, (6) the combinatorial explosion in waveform, signal attribute or sequence pattern matching, relational searching or heuristic evaluation processes would otherwise require very fast and expensive computational systems, very large memory capacities, large and complex storage hardware configurations, very slow software response times, or restriction of application of conventional algorithms to problems of limited complexity, or (7) the waveforms, signal attributes or sequences are random patterns generated by different random processes and the goal is to segment, match and organize the waveforms, signal attributes or sequences by the random processes which generated them.

The method according to embodiments of the present invention uses attractor-based processes to extract identity tokens indicating the content and order of frequencies, frequency distributions, waveforms, signal attributes or sequences or harmonics and sub-harmonics of frequencies or frequency distributions, or sub-waveforms, signal sub-attributes or subsequence symbols. These attractor processes map the frequency, frequency distribution, waveform, signal attribute or sequence from its original representation space (ORS), also termed a "source space" into a hierarchical multidimensional attractor space (HMAS). The HMAS can be configured to represent (1) embedded patterns (2) equivalent frequency, frequency distribution, waveform, signal attribute or symbol distributions within two or more frequencies, frequency distributions, waveforms, signal attributes or sequences or (3) exact frequency, frequency distribution, waveform, signal attribute or sequence matching.

Various types of waveform, signal attribute or sequence analysis operations can be performed by computational devices utilizing attractor tokens. Examples of such types of waveform, signal attribute or sequence analysis operations include:

(1) detection and recognition of waveform, signal attribute or sequence patterns;

(2) comparison of whole waveform, signal attribute or sequence or embedded sub-waveform, signal sub-attribute or subsequence pattern relationships in symbol sequences;

(3) relationship of waveform, signal attribute or sequence pattern structures between groups of sequence patterns represented by symbols; and (4) detection and recognition of structurally similar sequence patterns or pattern relationship structures composed of completely or partially disjoint symbol sets.

The symbol sequences and/or patterns can be representations of:

(1) sequences and/or patterns of events in a process;
(2) sequences and/or patterns of events in time;
(3) sequences and/or patterns of statements, operations, data types or sets of any combination thereof in computer languages forming a program or a meta-language;
(4) sequences and/or patterns of characters and Boolean operations or sets of any combination thereof, forming an executable or object code;
(5) sequences and/or patterns of nodes forming a network of linked notes forming astrophysical, geographic or geometric constructions or abstract structures such as graphs, and any representations of such constructions or structures;
(6) sequences and/or patterns of nodes forming a pathway in the network of linked nodes forming astrophysical, geographic or geometric constructions or abstract structures such as graphs, and any representations of such constructions or structures;
(7) sequences and/or patterns of physical states in materials, machines, or any physical system in general;
(8) sequences and/or patterns of graphics entities and the logical operators forming a graphics pattern;
(9) sequences and/or patterns of coefficients of binary polynomials and other types of mathematical or algebraic expressions;
(10) sequences and/or patterns of geometric building blocks and logical operators forming a geometric construction or abstract structure;
(11) sequences and/or patterns of words and word relationships forming a dictionary, a thesaurus, or a concept graph;
(12) sequences and/or patterns of diffeomorphic regions forming an atlas, chart, model or simulation of behavioral state expressions;
(13) sequences and/or patterns of terms in mathematical expansion series such as Taylor series or hierarchical embedding sequences such as catastrophe-theory seed functions;
(14) sequences and/or patterns of transactions, transaction types or transaction evaluations;
(15) sequences and/or patterns of computational or signal processing devices or device states or sequences and/or patterns of sets of device states representing a circuit, or arrangement of devices and circuits;
(16) sequences and/or patterns of entities, entity states, locations, activities and times or sets of any combinations thereof forming operational commands, schedules, agendas, plans, strategies, tactics or games;
(17) sequences and/or patterns of symbols expressing the identity of any numerical distribution series such as Fibonacci series;
(18) sequences and/or patterns of pixel patterns in images, sequences of pixel pattern relationships, sequences and/or patterns of Boolean or other logical operators or any combinations thereof or any sets thereof;
(19) sequences and/or patterns of waveforms, random or pseudo-random patterns, waveform features, attractors, repellers or types of relationships or sets of any combinations thereof; or
(20) anything else which can be described by mapping to symbols, sets of symbols, sequences, sets of sequences and/or patterns, embeddings of sequences and/or patterns, hierarchical or otherwise, relationships between symbols, relationships between sets of symbols, relationships between sequences and/or patterns, relationships between sets of sequences and/or patterns, relationships between sequence and/or pattern embeddings, whether hierarchical or otherwise, relationships between sets of sequence and/or pattern embeddings, whether hierarchical or otherwise, or any combinations thereof in any order, context or structure.

Such problems typically involve the discovery of symbols, sets of symbols, symbol-order patterns, or sets of symbol-order patterns or any combinations thereof, or relationships between symbols, symbol-order patterns, sequences or subsequences in any combination, or involve the detection, recognition or identification of symbols within sequences.

Discovering, detecting, recognizing or identifying these symbols, patterns or sequences or relationships between them allows the analysis of:

(1) similarities or anomalies in the identity of two or more sequences;
(2) similarities or anomalies in the patterns created by symbol-order within a sequence or a group of two or more sequences;
(3) similarities or anomalies in the structure or order of the symbol-order patterns within a sequence of symbol-order patterns or a sequence with a subset of its symbol-order being composed of symbol-order patterns;
(4) similarities or anomalies in the symbol content of symbol-order patterns including the sequence position of symbols within symbol-order patterns or sequences which represent insertions or deletions of symbols in sequences or in symbol-order patterns being compared;
(5) similarities or anomalies in symbol-order pattern types;
(6) similarities or anomalies in the occurrence or re-occurrence of symbol-order patterns within a sequence or a group of sequences;
(7) similarities or anomalies in the occurrence or re-occurrence of symbol-order pattern within a sequence or a group of sequences in a hierarchy of embedded sequences, embedded symbol-order patterns or a combination thereof;
(8) assembly of a whole sequence using symbol-order patterns made of or found within fragments of the whole sequence;
(9) similarities or anomalies in distances:
  a. between occurrences or re-occurrences of a symbol;
  b. between occurrences or re-occurrences of sets of symbols;
  c. between occurrences or re-occurrences of sets of different symbols;
  d. between occurrences or re-occurrences of sets of different symbol sets;
  e. between occurrences or re-occurrences of a symbol-order pattern;
  f. between occurrences or re-occurrences of sets of symbol-order patterns;
  g. between occurrences or re-occurrences of sets of different symbol-order patterns;
  h. between occurrences or re-occurrences of sets of different symbol-order pattern sets;
  i. between occurrences or re-occurrences of sequences having different symbol mappings; or
  j. between occurrences or re-occurrences of hierarchical embeddings of symbols, sets of symbols, symbol-order patterns, sets of symbol-order patterns, sequences or embeddings of the previous within hierarchical sequences or within a hierarchical sequence space;

(10) similarities or anomalies in any form of distance distribution, hierarchical embedding, embedding of embedding, distribution of distributions, or embeddings of the distances;

(11) indexing, classification or ranking schemes for symbols, sets of symbols, symbol-order patterns, sequence fragments or whole sequences by symbol content, symbol-order pattern, patterns of symbol-order patterns, distance distributions of symbols, symbol-order patterns or groups of symbol-order patterns or sequences by the similarity or difference of their features; or

(12) prediction of the occurrence or reoccurrence of:
  a. a symbol, a set of symbols;
  b. sets of symbol sets;
  c. a symbol-order pattern;
  d. sets of symbol-order patterns;
  e. a sequence;
  f. sets of sequences;
  g. a distance distribution;
  h. sets of distance distributions;
  i. a hierarchical embedding;
  j. sets of hierarchical embeddings; or
  k. any combinations of items a–j.

The mapping process results in each sequence or set element of the representation space being drawn to an attractor in the HMAS. Each attractor within the HMAS forms a unique token for a group of sequences with no overlap between the sequence groups represented by different attractors. The size of the sequence groups represented by a given attractor can be reduced from approximately half of all possible sequences to a much smaller subset of possible sequences.

The mapping process is repeated for a given sequence so that tokens are created for the whole sequence and a series of subsequences created by repeatedly removing a symbol from the one end of sequence and then repeating the process from the other end. The resulting string of tokens represents the exact identity of the whole sequence and all its subsequences ordered from each end. A token to spatial-coordinate mapping scheme is used to create a series of coordinates in a hierarchy of embedded pattern spaces or sub-spaces. Each pattern sub-space is a pattern space similar to a Hausdorf space.

When the attractor tokens are mapped into a Hausdorf or other similar pattern space, the tokens cause sequence and/or pattern-similarity characteristics to be compared by evaluating the spatial vectors. These similarity characteristics may also be between pattern, sub-pattern or sequence of sub-patterns. For brevity whenever the term pattern is used, it is intended to include not only a pattern or sequence, but also sub-pattern or sequence of sub-patterns. When the attractor tokens are mapped into a numerical space, pattern-similarity (i.e., similarity in the pattern, sub-pattern or sequence of sub-patterns) characteristics are compared by evaluating the numerical distance of the coordinate values.

When two patterns are mapped into a hierarchical set-theoretic space whose coordinates in each layer of the hierarchy are mapped to combinations of attractor tokens of a given pattern-length, the pattern-similarity characteristics of the two patterns are compared by evaluating the arithmetic distance between tokens of each layer coordinate representing the two patterns. For this type of set-theoretical space, a method for ordering the token coordinates is provided such that the distance between the tokens indicates pattern similarity and reveals the exact structure of whole pattern or subpattern matches between patterns or groups of patterns.

Attractors have the possibility of being used as spatial identities of repeating mathematical processes which cause random walks or pathways through a modeling space or iterative process steps applied to random values to converge on a fixed and unique end point or fixed and unique set of endpoints (the attractor) as the result of each process iteration. Because of the convergence, attractor processes are typically characterized as entropic and efficient. They are inherently insensitive to combinatorial explosion.

In an embodiment, the method uses attractor processes to map an unknown symbol pattern to an attractor whose identity forms a unique token describing a unique partition of all possible patterns in a pattern space. These attractor processes map the pattern from its original sequence representation space (OSRS) into a hierarchical multidimensional attractor space (HMAS). The HMAS can be configured to represent equivalent symbol distributions within two symbol patterns or perform exact symbol pattern matching.

The mapping process results in each pattern being drawn to an attractor in the HMAS. Each attractor within the HMAS forms a unique token for a group of patterns with no overlap between the pattern groups represented by different attractors. The size of the pattern groups represented by a given attractor can be reduced from approximately half of all possible patterns to a much smaller subset of possible patterns.

The mapping process is repeated for a given pattern so that tokens are created for the whole pattern and each subpattern created by removing a symbol from one end of the pattern. The resulting string of tokens represents the exact identity of the whole pattern and all its subpatterns. A token to spatial-coordinate mapping scheme methodology is provided for creating token coordinates providing solutions to one or more of the pattern-matching problems above.

Attractors are also considered repetitive mathematical processes which cause random patterns of movements or pathways through a modeling space or repeating process steps applied to random values to converge on a fixed and unique end point or fixed and unique set of endpoints as the result of each movement or process repetition. Because of the convergence, attractor processes are characterized as efficient and are inherently insensitive to combinatorial explosion problems.

Computational devices use symbols to represent things, processes and relationships. All computational models are composed of patterns of statements, descriptions, instructions and punctuation characters. To operate in a computer, these statements, descriptions, instructions and punctuation characters are translated into unique patterns of binary bit patterns or symbols that are interpreted and operated on by the processing unit of the computational device. A set of all symbols defined for interpretation is called the Symbol Set. A symbol-pattern is an ordered set of symbols in which each symbol is a member of the Symbol Set.

In an embodiment, the method uses an attractor process applied to a symbol-pattern, causing it to converge to a single coordinate or single repeating pattern of coordinates in a coordinate space. Each coordinate or pattern of coordinates is the unique end-point of an attractor process for a unique group of symbol-patterns. The collection of the all the group members of all the attractor end-points is exactly the collection of all possible symbol-patterns of that pattern length with no repeats or exclusions.

The attractor end-point coordinates or coordinate patterns are given unique labels that are the group identity for all symbol-patterns whose attractor processes cause them to arrive at that end-point coordinate or pattern of coordinates. As a result, all the possible symbol-patterns of a given length are divided into groups by their end-point coordinates or coordinate patterns.

By repeating this process for each symbol-subpattern created by deleting one symbol from the end of the symbol-pattern, each symbol-subpattern is given a group identity until the last symbol of the symbol-pattern is reached which is given its own symbol as its label.

The set of all these attractor end-point coordinates or coordinate set labels is called the Label Set. The labels within the Label Set are expressed in pattern from the label for the end symbol to the label for the group containing the whole symbol-pattern. The Label Set forms a unique identifier for the symbol-pattern and its set of subset symbol-patterns ordered from the end symbol. The target space is a representation space whose coordinates are the labels of the label set. The coordinates of the attractor space are mapped to the coordinates of the target space such that an attractor result to a coordinate in the attractor space causes a return from the target space of the representation for that attractor result. The target space can be configured to return a single label or a series o labels including punctuation for a series of attractor results. Whenever a label set is used, a target space will be created for the mapping of the representation from the attractor space.

In a set-theoretic space, the coordinate axes are composed of labels. The space between labels is empty and has no meaning. Coordinates in the space are composed of a set of labels with one label for each dimension.

If a set-theoretic space:
(1) has as many axes as the number of symbols in a symbol-pattern, and
(2) the axes of that space are ordered from the whole symbol-pattern to the last symbol, and
(3) the labels of each symbol-pattern and symbol-subpattern axis are the labels of the attractor end-point coordinates or coordinate patterns in that space, and
(4) the end symbol axis has as its labels the Symbol Set, and
(5) the coordinates of that space are the Label Sets of all the symbol-patterns of the same length composed of symbols from the Symbol Set,
then the space is called the Label Space or the attractor space representation.

A set-theoretic space composed of a hierarchy of Label Spaces arranged so they form a classification tree with branches and leaves representing symbol-pattern groups of similar composition and order is called the Classification Space or the analytic space.

The Classification Space allows the sorting of Label Sets into groups of predetermined content and content order. By sorting the Label Sets of symbol-patterns through the branch structure to leaves, each leaf collects a set of symbol-patterns of the same symbol content and symbol order structure. All symbol-patterns sharing the same branch structure have the same symbol content and order to the point where they diverge into different branches or leaves.

The Symbol Set, the Label Set, the Label Space, and the Classification Space are the building blocks of solution applications. Their combination and configuration allows the development of software and hardware solutions for problems represented by symbol-patterns which were heretofore intractable because of combinatorial explosion. Subsequently, the solution configuration can be run on small platforms at high speed and can be easily transported to programmable logic devices and application specific integrated circuits (ASICs). Furthermore, such pattern-matching methods using attractor tokens according to embodiments of the present invention are applicable to various fields including, for example, matching of deoxyribonucleic acid (DNA) patterns or other biotechnology applications.

The basic idea behind the attractor process is that some initial random behavior is mapped to a predictable outcome behavior. An analogy may be made to a rubber sheet onto which one placed a steel ball which caused the sheet to deform downward. The placement of the steel ball on the rubber sheet deforms the rubber sheet and sets up the attractor process. A marble that is subsequently tossed onto the rubber sheet will move around and around until it reaches the ball. The attractor is the process interaction between the marble and the deformed rubber sheet.

The primary characteristics of attractors are as follows:
(1) they cause random inputs to be mapped to predictable (i.e., fixed) outputs;
(2) variation of the specific parameters for a given attractor may be used to modify the number and/or type of perdictable outputs; and
(3) the output behaviors of attractors may be configured so they represent a map to specific groups of input patterns and/or behaviors, i.e,. mapped to the type and quality of the inputs.

By "predictable" used above, it is not intended that one knows in advance the type of behavior but rather that the behavior, once observed, will be repeatable and thus continue to be observed for the chosen set of specific parameters.

The input behavior is merely as set of attributes which is variable and which defines the current state of the object under consideration. In the marble example, the input behavior would specify the initial position and velocity of the marble when it is released onto the deformed rubber sheet.

In the first characteristic where random inputs to be mapped to predictable outputs, these mappings are done by an iterative process and this process converges to a fixed behavior.

In the third characteristic, the parameters of the attractor may be adjusted, to tune the mapping of the random inputs and the outputs such that, while the inputs are still random, the input behaviors within a specified range will all map to output one behavior and the input behavior within a second range will all map to another, different output behavior, and the input behavior within a third range will all map to yet another, still different output behavior. Thus, the output behavior then becomes an identity or membership qualifier for a group of input behaviors. When this happens, the attractor turns into a classifier.

The primary characteristics of a good classifier are as follows:
(1) every input is handled uniquely and predictably;
(2) there must be at least one other input which is also handled according to a) but is mapped to a different behavior; and
(3) for efficient classifiers, classifiers must do at least as well as least squares on random maps.

The concept of least squares is related to random walk problems. One may illustrate the procedure by assuming one want to find a randomly placed point in a square 1 meter on each side. First divide the square into half by drawing a horizontal line through the middle and ask if the point is on above or below the line. One it is established that the point is say above the line, one then divides the upper half into half by drawing a vertical line through the upper half and ask if the point is to the right or left. The process continues until one confines the point within an area of arbitrarily small size, thus solving the problem of finding the point within a certain degree of accuracy. When the prior knowledge about the existence of the input point is null, then the most efficient classifier is one that operates on this least squares principle.

The principles of embodiments of the invention may be understood in relation to an example of DNA pattern matching used to determine overlaps in nucleotide patterns. The DNA fragment patterns are only used as an example and are not meant to be limiting. The principles of the invention as elucidated by the DNA examples below are generally applicable to any random or non-random pattern. The overall objective is to classify different inputs into different groups using different behaviors as these inputs are mapped via an attractor process. The essence of the procedure is to classify patterns by studying the frequency of occurrences within the patterns.

As an example of the attractor process, the following two fragments will be examined.

Fragment 1:     GGATACGTCGTATAACGTA
                (SEQ ID NO: 1)

Fragment 2      TATAACGTATTAGACACGG
                (SEQ ID NO: 2)

The procedure for implementing embodiment of the invention extracts patterns from the input fragments so that the input fragments can be uniquely mapped to certain types of behavior.

The procedure is first illustrated with Fragment 1.

Fragment 1: GGATACGTCGTATAACGTA (SEQ ID NO: 1)

One first takes the entire fragment considering each nucleotide separately and counts the number of distinct nucleotide symbols. To facilitate and standardize the counting process for implementation on a data processor, one may assigns a digit value to each nucleotide using, for example, the mapping shown in Table 1.

TABLE 1

| Symbol | Mapped symbol |
|--------|---------------|
| A      | 0             |
| C      | 1             |
| G      | 2             |
| T      | 3             |

Using the above mapping one can map the input sequence or pattern into the following string 1:

[2,2,0,3,0,1,2,3,1,2,3,0,3,0,0,1,2,3,0]     String 1

One now chooses a base in which to perform the succeeding steps of the procedure. While any base (greater than 5) may be used, the below example proceeds with base 7 as a representative example.

One first converts the string 1 into a base 7 representation which can be labeled String 2. Since none of the entries of string 1 are greater than 6, the base 7 representation is the same sequence as string 1, so that string 1=string 2 or

[2,2,0,3,0,1,2,3,1,2,3,0,3,0,0,1,2,3,0]     String 2

Table 2 below, called a Numgram, is used to implement another part of the process. The first row of the Numgram list the integers specifying the base. For base, 7, integers 0, 1, . . . 6 are used to label the separate columns.

For row 2, one counts the number of 0's, 1's, 2's and 3's in string 2 and enters these count values in the corresponding column of row 2 of the Numgram.

For row 3, one counts the number of 0's, 1's, . . . 6's in row 2 and list these numbers in the corresponding column of row 3.

One repeats the counting and listing process as shown in Table 2. The counting and listing process is iterative and is seen to converge at row 4. Thus, continuing the counting and listing produces the same sequence as first appearing in row 4. Note that rows 5, 6 and all additional rows (not shown) are the same as row 4.

TABLE 2

| 0 | 1 | 2 | 3 | 4 | 5 | 6 | Row Number |
|---|---|---|---|---|---|---|------------|
| 0 | 1 | 2 | 3 | 4 | 5 | 6 | 1 |
| 5 | 6 | 5 | 3 | 0 | 0 | 0 | 2 |
| 3 | 0 | 0 | 1 | 0 | 2 | 1 | 3 |
| 3 | 2 | 1 | 1 | 0 | 0 | 0 | 4 |
| 3 | 2 | 1 | 1 | 0 | 0 | 0 | 5 |
| 3 | 2 | 1 | 1 | 0 | 0 | 0 | 6 |

The sequence is seen to converge to [3,2,1,1,0,0,0].

The Numgram (atractor process) converges to a fixed point "behavior" in an attractor space. This fixed point has a repeating cycle of one (a single step). One may represent this behavior in the attractor space by assigning a value, which is really a label, of 1 to this single step cycle. The label is expressed in an attractor space representation (also referred to above as the Label Space). In other cases, as seen below, the Numgram behavior is observed to repeat in a cycle of more than one step and in such case, one represents such behavior by assigning a value or label of 0 in the attractor space representation to distinguish such behavior from the one cycle behavior. One may of course interchange the zero and one assignments as long as one is consistent. One may term the one cycle behavior as a converging behavior and the multiple cycle behavior as oscillating. The important point, however, is that there are two distinct types of behavior and that any given sequence will always (i.e., repeatedly) exhibit the same behavior and thus be mapped from a source space (the Fragment input pattern) to the attractor space (the fixed point behaviors) in a repeatable (i.e., predictable) manner.

Now one groups the nucleotides in pairs beginning at the left hand side of the fragment and counts the number of distinct pairs. Again, this counting may be facilitated by assigning a number 0, 1, 2, . . . 15 to each distinct pair and then counting the number of 0's, 1's, 2's, . . . 15's. The following Table 3 is useful for the conversion:

TABLE 3

| Symbol | Mapped symbol |
|--------|---------------|
| AA     | 0             |
| AC     | 1             |
| AG     | 2             |
| AT     | 3             |
| CA     | 4             |
| CC     | 5             |
| CG     | 6             |
| CT     | 7             |
| GA     | 8             |

TABLE 3-continued

| Symbol | Mapped symbol |
|---|---|
| GC | 9 |
| GG | 10 |
| GT | 11 |
| TA | 12 |
| TC | 13 |
| TG | 14 |
| TT | 15 |

For example, Fragment 1 is grouped into pairs as follows:
GG AT AC GT CG TA TA AC GT A(SEQ ID NO: 1)
where the last nucleotide has no matching pair, it is simply dropped.

From Table 3, one may assign a number to each of the pairs as follows:

```
GG AT AC GT CG TA TA AC GT        (residues
                                   1–18
                                   of SEQ ID
                                   NO: 1)
10  3  1  11  6  12  12  1  11    String 3
```

The string 3 sequence [10, 3, 1, 1, 6, 12, 12, 1, 11] is now converted into base 7 to yield string 4:

[13, 3, 1, 14, 6, 15, 15, 1, 14]    String 4

A new Numgram is produced as in Table 4 with the first row labeling the columns according to the base 7 selected.

One now simply counts the number of 0's, 1's . . . 6's and enters this count as the second row of the Numgram. In counting string 4, it is noted, for example, that the number of one's is 7 since one counts the ones regardless of whether they are part of other digits. For example, the string [13, 3, 1] contains 2 ones. Using this approach, row 2 of the Numgram is seen to contain the string [0,7,0,2,2,2,1]. In the general case, every time a count value is larger than or equal to the base, it is converted modulo the base. Thus, the 7 in row 2 is converted into 10 (base 7) and again, the number of 0's, 1's . . . 6's are counted and listed in row 3 of the Numgram. (The intermediate step of mapping 7 into 10 is not shown). The counting step results in string [3,2,3,0,0,0,0] in row 3.

TABLE 4

| 0 | 1 | 2 | 3 | 4 | 5 | 6 | Row Number |
|---|---|---|---|---|---|---|---|
| 0 | 1 | 2 | 3 | 4 | 5 | 6 | 1 |
| 0 | 7 | 0 | 2 | 2 | 2 | 1 | 2 |
| 3 | 2 | 3 | 0 | 0 | 0 | 0 | 3 |
| 4 | 0 | 1 | 2 | 0 | 0 | 0 | 4 |
| 4 | 1 | 1 | 0 | 1 | 0 | 0 | 5 |
| 3 | 3 | 0 | 0 | 1 | 0 | 0 | 6 |
| 4 | 1 | 0 | 2 | 0 | 0 | 0 | 7 |
| 4 | 1 | 1 | 0 | 1 | 0 | 0 | 8 |
| 3 | 3 | 0 | 0 | 1 | 0 | 0 | 6 |
| 4 | 1 | 0 | 2 | 0 | 0 | 0 | 7 |
| 4 | 1 | 1 | 0 | 1 | 0 | 0 | 8 |

This sequence has a 3-cycle behavior, repeating values beginning at row 5 with the string [4,1,1,0,1,0,0,]. As such, the Numgram is assigned a value of 0 in the attractor space representation.

Triplets

One now groups the nucleotides into triplets (or codons) and again counts the number of distinct triplets. Fragment 1 separated into triplets is as follows:
GGA TAC GTC GTA TAA CGT A (SEQ ID NO: 1)

For ease of computation, one assigns a numerical value to each distinct triplet to assist in counting the sixty-four possible permutations. Any incomplete triplet groupings are ignored. The following Table 5 may be utilized.

TABLE 5

| sym-bol | Mapped symbol | symbol | Mapped symbol | Symbol | Mapped Symbol | Symbol | Mapped symbol |
|---|---|---|---|---|---|---|---|
| AAA | 0 | CAA | 16 | GAA | 32 | TAA | 48 |
| AAC | 1 | CAC | 17 | GAC | 33 | TAC | 49 |
| AAG | 2 | CAG | 18 | GAG | 34 | TAG | 50 |
| AAT | 3 | CAT | 19 | GAT | 35 | TAT | 51 |
| ACA | 4 | CCA | 20 | GCA | 36 | TCA | 52 |
| ACC | 5 | CCC | 21 | GCC | 37 | TCC | 53 |
| ACG | 6 | CCG | 22 | GCG | 38 | TCG | 54 |
| ACT | 7 | CCT | 23 | GCT | 39 | TCT | 55 |
| AGA | 8 | CGA | 24 | GGA | 40 | TGA | 56 |
| AGC | 9 | CGC | 25 | GGC | 41 | TGC | 57 |
| AGG | 10 | CGG | 26 | GGG | 42 | TGG | 58 |
| AGT | 11 | CGT | 27 | GGT | 43 | TGT | 59 |
| ATA | 12 | CTA | 28 | GTA | 44 | TTA | 60 |
| ATC | 13 | CTC | 29 | GTC | 45 | TCC | 61 |
| ATG | 14 | CTG | 30 | GTG | 46 | TTG | 62 |
| ATT | 15 | CTT | 31 | GTT | 47 | TTT | 63 |

Using Table 5, Fragment 1 is seen to be represented as String 5 below:

[40, 49, 45, 44, 48, 27]    String 5.

Converting this string into base 7 yields:

[55, 100, 63, 62, 66, 36]    String 6.

The Numgram may now be developed as seen in Table 6 below.

TABLE 6

| 0 | 1 | 2 | 3 | 4 | 5 | 6 | Row Number |
|---|---|---|---|---|---|---|---|
| 0 | 1 | 2 | 3 | 4 | 5 | 6 | 1 |
| 2 | 1 | 1 | 2 | 0 | 2 | 5 | 2 |
| 1 | 2 | 3 | 0 | 0 | 1 | 0 | 3 |
| 3 | 2 | 1 | 1 | 0 | 0 | 0 | 4 |
| 3 | 2 | 1 | 1 | 0 | 0 | 0 | 5 |

The above sequence, as seen to exhibit type "1" behavior.

Collecting the tokens for strings 2 (single symbol), 4 (pair symbols) and 6 (triplet symbols) gives the sequence: [101]. Fragment 1 is further mapped using the Numgram tables for each of the three symbol combinations (single, pairs and triplets) for each of a plurality of sub-framgments obtained by deleting Fragment 1 from the left, one symbol at a time. A further mapping is preformed by deleting Fragment 1 from the right, one symbol a time. Table 7 below illustrates a pyramid structure illustrating this further mapping and shows the main fragment (line 0) and the resulting 18 sub-fragments (lines 1–18).

TABLE 7

Sequence 1: GGATACGTCGTATAACGTA
(SEQ ID NO: 1 and below are sequences that range from residues 1–19 down through residue 1 of SEQ ID NO: 1)

| Left copy | Right copy | Line # |
|---|---|---|
| GGATACGTCGTATAACGTA | GGATACGTCGTATAACGTA | 0 |
| GATACGTCGTATAACGTA | GGATACGTCGTATAACGT | 1 |
| ATACGTCGTATAACGTA | GGATACGTCGTATAACG | 2 |
| TACGTCGTATAACGTA | GGATACGTCGTATAAC | 3 |
| ACGTCGTATAACGTA | GGATACGTCGTATAA | 4 |
| CGTCGTATAACGTA | GGATACGTCGTATA | 5 |
| GTCGTATAACGTA | GGATACGTCGTAT | 6 |
| TCGTATAACGTA | GGATACGTCGTA | 7 |
| CGTATAACGTA | GGATACGTCGT | 8 |
| GTATAACGTA | GGATACGTCG | 9 |
| TATAACGTA | GGATACGTC | 10 |
| ATAACGTA | GGATACGT | 11 |
| TAACGTA | GGATACG | 12 |
| AACGTA | GGATAC | 13 |
| ACGTA | GGATA | 14 |
| CGTA | GGAT | 15 |
| GTA | GGA | 16 |
| TA | GG | 17 |
| A | G | 18 |

To illustrate the further mapping, one examines the first, left sub-fragment shown in line 1 which is the sub-fragment:
GATACGTCGTATAACGTA (residues 2–19 of SEQ ID NO: 1)

Performing the Numgram procedure for this first sub-fragment using one symbol at a time, two symbols at a time and three symbols at a time (in a similar fashion as illustrated above for the main fragment in line 0) gives the further mapping [000].

Taking the second sub-fragment on the left hand side of the pyramid shown in line 2 and performing the Numgram procedure for each symbol separately, pairs of symbols and triplets give the mapping: [100]. Continuing with this process one may build a table of behavior values for each of the sub-fragments as shown in Table 8 below.

TABLE 8

Fragment 1; main and sub-fragment token strings for Left hand Side

| Line | Token String |
|---|---|
| 0 | 101 |
| 1 | 000 |
| 2 | 100 |

TABLE 8-continued

Fragment 1; main and sub-fragment token strings for Left hand Side

| Line | Token String |
|---|---|
| 3 | 000 |
| 4 | 111 |
| 5 | 001 |
| 6 | 110 |
| 7 | 000 |
| 8 | 110 |
| 9 | 000 |
| 10 | 100 |
| 11 | 100 |
| 12 | 100 |
| 13 | 000 |
| 14 | 000 |
| 15 | 000 |
| 16 | 000 |
| 17 | 000 |
| 18 | 000 |

The complete token string for the 19 symbols (labeled 0–18) of Fragment 1 obtained from the left hand side of the pyramid is thus written as:
G101000100000110011100001100001001001000000000000 000000000 (0 . . . 18L) SEQ#1

SEQ#1 refers to Fragment 1, and (0 . . . 18L) refers to the initial source set which had 19 elements (nucleotides) and whose token string was formed, inter alia, by chopping one symbol at a time from the left of the original pattern. The label (0 . . . 18L) SEQ#1 thus uniquely identifies the source set. It will be recalled that the token string is simply a representation of the behavior of the source set interacting with the attractor process. Appending the identifying label (e.g., (0 . . . 18L) SEQ#1) to the token string maps the source set representation to an analytic space (also referred to above as the Classification Space). The analytic space is a space containing the union of the source set identification and the attractor set representation.

One may now repeat the same process by deleting one symbol from the right, essentially treating the sub-fragments of the right hand side of the pyramid. The resulting token string for the right side of the pyramid is given as:
G101001101011101101110100100000100000000000000 000000000 (0.18R) SEQ#1

The initial "G": is appended to indicated the first letter symbol in the fragment as a further means of identifying the sequence.

The resulting string of tokens represents the exact identity of the whole sequence and all its subsequences ordered from each end.

The two token strings corresponding to source sets (0 . . . 18L) SEQ#1 and (0 . . . 18R) SEQ#1 characterize Fragment 1, characterizing the behavior of single/pair/triplet groups of the nineteen symbols and their possible sub-fragments taken from the left and right.

One now needs to similarly map each of the sub-fragments. First one may chop off a symbol from the left hand side of fragment 1. Referring again to the pyramid of Table 7, the sequence to be mapped is:
GATACGTCGTATAACGTA (residues 2–19 of SEQ ID NO: 1)

Treating this sub-fragment as before, one may develop the complete token strings for symbols (1 . . . 18L) using the Numgram tables as illustrated above. The nomenclature (1 . . . 18L) indicates that the starting sequence is composed of symbols 1 through 18 and that the token string is derived by chopping off one symbol from the right after each single/pair/triplet token is produced. A simplification may be used upon realizing that the sub-sequences are already present in (0 . . . 18L) and may be obtained by dropping the first three digits [101] resulting from the main Fragment single/pair/triplet mapping. Thus using (0 . . . 18L) SEQ#1 and dropping the first three digits gives:
G00010000011100111000011000010010010000000000 000000000 (1 . . . 18L) SEQ#1

The token strings for the right hand side of the pyramid may not be simply obtained from the prior higher level fragment and thus need to be generated using the Numgram tables as taught above.

The resulting token strings obtained by continuing to chop off a symbol from the left hand side of the pyramid (together with their token strings resulting by chopping off from the right for the same starting sequence) are as follows:

Further chopping of the symbols will only produce zeros so that the Numgram process may be stopped at symbols sequence (12 . . . 18), i.e., the $13^{th}$ through $19^{th}$ symbol.

One may now go back to the main Fragment 1 and form "right" side sub-fragments taken from the right hand side of the pyramid. Successive left and right symbol chopping using the right hand side of the pyramid gives token strings of the symbol sequences, (0 . . . 17L); (0 . . . 17R); (0 . . . 16L); (0 . . . 16R). etc. It is noted that some simplification may again take place in that (0 . . . 17R) may be obtained from the already computed value of (0 . . . 18R) by dropping the initial 3 digits. Further, (0 . . . 16R) may be obtained from (0 . . . 17R) by dropping the initial 3 digits from (0 . . . 17R) etc.

The resulting token strings obtained by continuing to chop off a symbol from the right hand side of the pyramid (together with their token strings for the same level left hand side) are as follows:

```
Chopping GGATACGTCGTATAACGTA (SEQ ID NO: 1) from the left...

Initially GGATACGTCGTATAACGTA (SEQ ID NO: 1) gives

G10100010000011100111000011000010010010000000000000000000 (0..18L) (SEQ#1)

G10100110110110100011011011001000010010000000000000000000 (0..18R) (SEQ#1)

GATACGTCGTATAACGTA (residues 2-19 of SEQ ID NO: 1)
G000100000111001110000110000100100100000000000000000000 (1..1SL) (SEQ#1)
G00010010010000011011001001000000000000000000000000000 (1..18R) (SEQ#1)

ATACGTCGTATAACGTA (residues 3-19 of SEQ ID NO: 1)
A100000111001110000110001001001010000000000000000000 (2..18L) (SEQ#1)
A10000011001011001010000000000000000000000000000000 (2..18R) (SEQ#1)

TACGTCGTATAACGTA (residues 4-19 of SEQ ID NO: 1)
T0001110011100001100010010010100000000000000000000 (3..18L) (SEQ#1)
T0001000011010011100100101100000000000000000000000 (3..18R) (SEQ#1)

ACGTCGTATAACGTA (residues 5-19 of SEQ ID NO: 1)
A11100111000011000100100100000000000000000000000 (4..18L) (SEQ#1)
A111011011111110010000000000000000000000000000000 (4..18R) (SEQ#1)

CGTCGTATAACGTA (residues 6-19 of SEQ ID NO: 1)
C001110000110001001001000000000000000000000000 (5..18L) (SEQ#1)
C001011011000000000100000000000000000000000000 (5..18R) (SEQ#1)

GTCGTATAACGTA (residues 7-19 of SEQ ID NO: 1)
G1100001100001001001000000000000000000000000 (6..18L) (SEQ#1)
G1101100100101101101000000000000000000000000 (6..18R) (SEQ#1)

TCGTATAACGTA (residues 8-19 of SEQ ID NO: 1)
T0001100001001001000000000000000000000000 (7..18L) (SEQ#1)
T0001010011010001100000000000000000000000 (7..18R) (SEQ#1)

CGTATAACGTA (residues 9-19 of SEQ ID NO: 1)
C110000100100100000000000000000000000 (8..18L) (SEQ#1)
C110010000100100000000000000000000000 (8..18R) (SEQ#1)

GTATAACGTA (residues 10-19 of SEQ ID NO: 1)
G0001001001000000000000000000000000 (9..18L) (SEQ#1)
G00010010010000000000000000000000 (9..18R) (SEQ#1)

TATAACGTA (residues 11-19 of SEQ ID NO: 1)
T100100100000000000000000000000 (10..18L) (SEQ#1)
T100000100000000000000000000000 (10..18R) (SEQ#1)

ATAACGTA (residues 12-19 of SEQ ID NO: 1)
A100100000000000000000000000 (11..18L) (SEQ#1)
A100100000000000000000000000 (11..18R) (SEQ#1)

TAACGTA (residues 13-19 of SEQ ID NO: 1)
T10000000000000000000000000 (12..18L) (SEQ#1)
T10000000000000000000000000 (12..18R) (SEQ#1)
```

```
Chopping GGATACGTCGTATAACGTA (SEQ ID NO: 1) from the fight...

GGATACGTCGTATAACGT (residues 1-18 of SEQ ID NO: 1)
G0011000001000110111110101010100001000000000000000000 (0..17L) (SEQ#1)
G0011011011010001101101100100001001000000000000000000 (0..17R) (SEQ#1)

GGATACGTCGTATAACG (residues 1-17 of SEQ ID NO: 1)
G101100110001011011010001000100100000000000000000 (0..16L) (SEQ#1)
G101101101000110110110010000100100000000000000000 (0..16R) (SEQ#1)

GGATACGTCGTATAAC (residues 1-16 of SEQ ID NO: 1)
G10110001010111100001010110010000000000000000000 (0..15L) (SEQ#1)
G10110100011011011001000010010000000000000000000 (0..15R) (SEQ#1)

GGATACGTCGTATAA (residues 1-15 of SEQ ID NO: 1)
G10100011000111000011000010000000000000000000 (0..14L) (SEQ#1)
G10100011011011001000010010000000000000000000 (0..14R) (SEQ#1)

GGATACGTCGTATA (residues 1-14 of SEQ ID NO: 1)
G0001100101100100001101000000000000000000 (0..13L) (SEQ#1)
G0001101101100100001001000000000000000000 (0..13R) (SEQ#1)

GGATACGTCGTAT (residues 1-13 of SEQ ID NO: 1)
G110110100010000100100000000000000000 (0..12L) (SEQ#1)
G110110110010000100100000000000000000 (0..12R) (SEQ#1)

GGATACGTCGTA (residues 1-12 of SEQ ID NO: 1)
G11001000001000000000000000000000 (0..11L) (SEQ#1)
G11011001000010010000000000000000 (0..11R) (SEQ#1)

GGATACGTCGT (residues 1-11 of SEQ ID NO: 1)
G110010000110000000000000000000 (0..10L) (SEQ#1)
G110010000100100000000000000000 (0..10R) (SEQ#1)

GGATACGTCG (residues 1-10 of SEQ ID NO: 1)
G01000000000000000000000000000 (0..9L) (SEQ#1)
G01000010010000000000000000000 (0..9R) (SEQ#1)

GGATACGTC (residues 1-9 of SEQ ID NO: 1)
G000000000000000000000000000 (0..8L) (SEQ#1)
G000100100000000000000000000 (0..8R) (SEQ#1)

GGATACGT (residues 1-8 of SEQ ID NO: 1)
G10000000000000000000000 (0..7L) (SEQ#1)
G10010000000000000000000 (0..7R) (SEQ#1)

GGATACG (residues 1-7 of SEQ ID NO: 1)
G100000000000000000000 (0..6L) (SEQ#1)
G100000000000000000000 (0..6R) (SEQ#1)
```

A similar procedure may be used to obtain the token strings for Fragment 2. The pyramid for use in computing the right and left sub-fragments is as follows:

| Second Fragment: TATAACGTATTAGACACGG (SEQ ID NO: 2 and below are sequences that range from residues 1-19 down through residue 1 of SEQ ID NO: 2) | | |
|---|---|---|
| Left Copy | Right Copy | Line # |
| TATAACGTATTAGACACGG | TATAACGTATTAGACACGG | 0 |
| ATAACGTATTAGACACGG | TATAACGTATTAGACACG | 1 |
| TAACGTATTAGACACGG | TATAACGTATTAGACAC | 2 |
| AACGTATTAGACACGG | TATAACGTATTAGACA | 3 |
| ACGTATTAGACACGG | TATAACGTATTAGAC | 4 |
| CGTATTAGACACGG | TATAACGTATTAGA | 5 |
| GTATTAGACACGG | TATAACGTATTAG | 6 |
| TATTAGACACGG | TATAACGTATTA | 7 |
| ATTAGACACGG | TATAACGTATT | 8 |
| TTAGACACGG | TATAACGTAT | 9 |
| TAGACACGG | TATAACGTA | 10 |
| AGACACGG | TATAACGT | 11 |
| GACACGG | TATAACG | 12 |
| ACACGG | TATAAC | 13 |
| CACGG | TATAA | 14 |
| ACGG | TATA | 15 |
| CCC | TAT | 16 |
| GG | TA | 17 |
| G | T | 18 |

The results for Fragment 2 are as follows:

```
Chopping TATAACGTATTAGACACGG (SEQ ID NO: 2) from the left...

TATAACGTATTAGACACGG (SEQ ID NO: 2)
T001110100100110011110110100000100000000000000000000000 (0..18L) (SEQ#2)
T001101011111101001111011110010100000100000000000000000 (0..18R) (SEQ#2)

ATAACGTATTAGACACGG (residues 2-19 of SEQ ID NO: 2)
A110100100110011110110100000100000000000000000000000 (1..18L) (SEQ#2)
A110100001001010010011000001001001000000000000000000 (1..18R) (SEQ#2)

TAACGTATTAGACACGG (residues 3-19 of SEQ ID NO: 2)
110010011001111011010000010000000000000000000000 (2..18L) (SEQ#2)
T100100010110110010110010100000100000000000000000 (2..18R) (SEQ#2)

AACGTATTAGACACGG (residues 4-19 of SEQ ID NO: 2)
A101100111101101000001000000000000000000000000 (3..18L) (SEQ#2)
A100010111111111000001000010000000000000000000 (3..18R) (SEQ#2)

ACGTATTAGACACGG (residues 5-19 of SEQ ID NO: 2)
A110011110110100000100000000000000000000000 (4..18L) (SEQ#2)
A110011111111101001101000100000000000000000 (4..18R) (SEQ#2)

CGTATTAGACACGG (residues 6-19 of SEQ ID NO: 2)
C01111011010000010000000000000000000000000 (5..18L) (SEQ#2)
C01101111111001010010010000000000000000000 (5..18R) (SEQ#2)

GTATTAGACACGG (residues 7-19 of SEQ ID NO: 2)
G110110100000100000000000000000000000 (6..18L) (SEQ#2)
G110110110010100000000000000000000000 (6..18R) (SEQ#2)

TATTAGACACGG (residues 8-19 of SEQ ID NO: 2)
T110100001000000000000000000000000 (7..18L) (SEQ#2)
T110101001101000000000000000000000 (7..18R) (SEQ#2)

ATTAGACACGG (residues 9-19 of SEQ ID NO: 2)
A10000010000000000000000000000000 (8..18L) (SEQ#2)
A10000010010010000000000000000000 (8..18R) (SEQ#2)

TTAGACACGG (residues 10-19 of SEQ ID NO: 2)
T0001000000000000000000000000 (9..18L) (SEQ#2)
T0000001001000000000000000000 (9..18R) (SEQ#2)

TAGACACGG (residues 11-19 of SEQ ID NO: 2)
T10000000000000000000000000 (10..18L) (SEQ#2)
T10010010000000000000000000 (10..18R) (SEQ#2)

AGACACGG (residues 12-19 of SEQ ID NO: 2)
A0000000000000000000000000 (11..18L) (SEQ#2)
A0000000000000000000000000 (11..18R) (SEQ#2)

GACACGG (residues 13-19 of SEQ ID NO: 2)
G000000000000000000000000 (12..18L) (SEQ#2)
G000000000000000000000000 (12..18R) (SEQ#2)

Chopping TATAACGTATTAGACACGG (SEQ ID NO: 2) from the right...

TATAACGTATTAGACACG (residues 1-18 of SEQ ID NO: 2)
T101100100010011011110101000001000000000000000000000 (0..17L) (SEQ#2)
T101011111010011110111100101000001000000000000000000 (0..17R) (SEQ#2)

TATAACGTATTAGACAC (residues 1-17 of SEQ ID NO: 2)
T011000010111111111110001100100100000000000000000000 (0..16L) (SEQ#2)
T011111101001111011110010100000100000000000000000000 (0..16R) (SEQ#2)

TATAACGTATTAGACA (residues 1-16 of SEQ ID NO: 2)
T111100110111111110010101100100000000000000000000 (0..15L) (SEQ#2)
T111101001111011110010100001000000000000000000000 (0..15R) (SEQ#2)

TATAACGTATTAGAC (residues 1-15 of SEQ ID NO: 2)
T101101110111101010100000100000000000000000000 (0..14L) (SEQ#2)
T101001111011110010100000100000000000000000000 (0..14R) (SEQ#2)

TATAACGTATTAGA (residues 1-14 of SEQ ID NO: 2)
T00100101000000110000000000000000000000000 (0..13L) (SEQ#2)
T00111101111001010000010000000000000000000 (0..13R) (SEQ#2)

TATAACGTATTAG (residues 1-13 of SEQ ID NO: 2)
T1110011100001011000000000000000000000000 (0..12L) (SEQ#2)
```

```
T1110111100101000001000000000000000000 (0..12R) (SEQ#2)

TATAACGTATTA (residues 1-12 of SEQ ID NO: 2)
T01110001010000010000000000000000000 (0..11L) (SEQ#2)
T01111001010000010000000000000000000 (0..11R) (SEQ#2)

TATAACGTATT (residues 1-11 of SEQ ID NO: 2)
T1100001000001000000000000000000 (0..10L) (SEQ#2)
T1100101000001000000000000000000 (0..10R) (SEQ#2)

TATAACGTAT (residues 1-10 of SEQ ID NO: 2)
T010100001000000000000000000000 (0..9L) (SEQ#2)
T010100001000000000000000000000 (0..9R) (SEQ#2)

TATAACGTA (residues 1-9 of SEQ ID NO: 2)
T1001001000000000000000000000 (0..8L) (SEQ#2)
T1000001000000000000000000000 (0..8R) (SEQ#2)

TATAACGT (residues 1-8 of SEQ ID NO: 2)
T00010000000000000000000000 (0..7L) (SEQ#2)
T00010000000000000000000000 (0..7R) (SEQ#2)

TATAACG (residues 1-7 of SEQ ID NO: 2)
T100000000000000000000000 (0..6L) (SEQ#2)
T100000000000000000000000 (0..6R) (SEQ#2)
```

Since the fragments (and their sub-fragments) are uniquely mapped to the token strings, fragment matching is simply obtained by sorting the token strings in ascending order for like pre-fixed letters. Matching fragment and/or sub-fragments will sort next to each other as they will have identical values for their token strings.

Sorting gives the following results:

Sorted bit strings:

```
A00000000000000000000000000 (11..18R)                              (SEQ #2)
A00000000000000000000000000 (11..18L)                              (SEQ #2)

A1000001000000000000000000000000 (8..18L)                          (SEQ #2)
A1000001001001000000000000000000 (8..18R)                          (SEQ #2)

A1000001100101100101000000000000000000000000 (2..18R)              (SEQ #1)
A1000001110011100001100001001001000000000000000000 (2..18L)        (SEQ #1)

A1G0010111111111000001000001000000000000000000 (3..18R)            (SEQ #2)

A10010000000000000000000000 (11..18R)                              (SEQ #1)
A10010000000000000000000000 (11..18L)                              (SEQ #1)

A1001100111101101000001000000000000000000000 (3..18L)              (SEQ #2)

A1100111101101000001000000000000000000000 (4..18L)                (SEQ #2)
A1100111111111010011010001000000000000000000 (4..18R)             (SEQ #2)

A11010000010010100100110000010010010000000000000000 (1..18R)       (SEQ #2)
A11010010011001111011010000010000000000000000000 (1..18L)          (SEQ #2)

A1110011100001100010010010000000000000000000 (4..18L)              (SEQ #1)
A1110110111111100100000000000000000000000 (4..18R)                 (SEQ #1)

C001011011000000001000000000000000000000 (5..18R)                  (SEQ #1)
C0011100001100001001001000000000000000000 (5..18L)                 (SEQ #1)

C01101111111001010010010000000000000000000 (5..18R)                (SEQ #2)
C01111011010000100000000000000000000000 (5..18L)                   (SEQ #2)

C1100001001001000000000000000000000 (8..18L)                       (SEQ #1)
C1100100001001000000000000000000000 (8..18R)                       (SEQ #1)

G00000000000000000000000 (12..18L)                                 (SEQ #2)
G00000000000000000000000 (12..18R)                                 (SEQ #2)

G000000000000000000000000000 (0..8L)                               (SEQ #1)

G00010000011100111000011000010010010000000000000 (1..18L)          (SEQ #1)

G000100100000000000000000000 (0..8R)                               (SEQ #1)

G0001001001000000000000000000 (9..18R)                             (SEQ #1)
G0001001001000000000000000000 (9..18L)                             (SEQ #1)
```

-continued

```
G000100100100000110110010010000000000000000000000 (1..18R)         (SEQ #1)

G000110010110010000110100000000000000000000 (0..13L)               (SEQ #1)
G000110110110010000100100000000000000000000 (0..13R)               (SEQ #1)

G001100000100011011110101010000100000000000000000 (0..17L)         (SEQ #1)
G001101101101000110110110010000100100000000000000 (0..17R)         (SEQ #1)

G010000000000000000000000000000 (0..9L)                            (SEQ #1)
G010000100100000000000000000000 (0..9R)                            (SEQ #1)

G100000000000000000000000 (0..6R)                                  (SEQ #1)
G100000000000000000000000 (0..6L)                                  (SEQ #1)

G100000000000000000000000000 (0..7L)                               (SEQ #1)
G100100000000000000000000000 (0..7R)                               (SEQ #1)

G101000100000111001110000110000100100100000000000000000 (0..18L)   (SEQ #1)

G101000110001110001100001000000000000000000 (0..14L)               (SEQ #1)
G101000110110110010000100100000000000000000 (0..14R)               (SEQ #1)

G101001101101101000110110110010000100100000000000000 (0..18R)      (SEQ #1)

G101100010101111000010101100100000000000000000 (0..15L)            (SEQ #1)

G101100110001011011010001000100100000000000000000 (0..16L)         (SEQ #1)

G101101000110110110010000100100000000000000000 (0..15R)            (SEQ #1)

G101101101000110110110010000100100000000000000000 (0..16R)         (SEQ #1)

G110000110000100100100000000000000000000 (6..18L)                  (SEQ #1)

G110010000010000000000000000000000000 (0..11L)                     (SEQ #1)

G110010000100100000000000000000000 (0..10R)                        (SEQ #1)

G110010000110000000000000000000000 (0..10L)                        (SEQ #1)

G110110010000100100000000000000000000 (0..11R)                     (SEQ #1)

G110110010010110110100000000000000000000 (6..18R)                  (SEQ #1)
G110110100000100000000000000000000000 (6..18L)                     (SEQ #2)

G110110100010000100100000000000000000000 (0..12L)                  (SEQ #1)
G110110110010000100100000000000000000000 (0..12R)                  (SEQ #1)
G110110110010100000000000000000000000 (6..18R)                     (SEQ #2)

T000000100100000000000000000000 (9..18R)                           (SEQ #2)
T000100000000000000000000000 (0..7R)                               (SEQ #2)
T000100000000000000000000000 (0..7L)                               (SEQ #2)

T000100000000000000000000000000 (9..18L)                           (SEQ #2)

T000100001101001110010010110000000000000000000 (3..18R)            (SEQ #1)

T000101001101000100000000000000000 (7..18R)                        (SEQ #1)
T000110000100100100000000000000000 (7..18L)                        (SEQ #1)

T00G111001110001100001001001000000000000000 (3..18L)               (SEQ #1)

T001001010000001100000000000000000000 (0..13L)                     (SEQ #2)

T001101011111101001111011110010100000100000000000000000 (0..18R)   (SEQ #2)

T001110100100110011110110100000100000000000000000 (0..18L)         (SEQ #2)

T001111011110010100001000000000000000000 (0..13R)                  (SEQ #2)

T010100000100000000000000000000 (0..9L)                            (SEQ #2)
T010100000100000000000000000000 (0..9R)                            (SEQ #2)

T011000010111111111100011001001000000000000000000 (0..16L)         (SEQ #2)

T011100010100001000000000000000000 (0..11L)                        (SEQ #2)
T011110010100001000000000000000000 (0..11R)                        (SEQ #2)

T011111101001111011110010100000100000000000000000 (0..16R)         (SEQ #2)
```

-continued

```
T100000000000000000000 (12..18R)                              (SEQ #1)
T100000000000000000000 (12..18L)                              (SEQ #1)

T100000000000000000000 (0..6R)                                (SEQ #2)
T100000000000000000000 (0..6L)                                (SEQ #2)

T1000000000000000000000 (10..18L)                             (SEQ #2)
T1000001000000000000000 (10..18R)**********************       (SEQ #1)
T1000001000000000000000 (0..8R)***********************        (SEQ #2)

T1001000101101100101100101000001000000000000000000 (2..18R)   (SEQ #2)

T100100100000000000000000 (0..8L)**********************       (SEQ #2)
T100100100000000000000000 (10..18R)                           (SEQ #2)
T100100100000000000000000 (10..18L)**********************     (SEQ #1)

T10010011001111011010000010000000000000000000000 (2..18L)     (SEQ #2)

T101001111011110010000010000000000000000000 (0..14R)          (SEQ #2)

T101011111101001111011110010100001000000000000000000 (0..17R) (SEQ #2)
T101100100010011011110101000001000000000000000000 (0..17L)    (SEQ #2)

T101101110111101010000010000000000000000000 (0..14L)          (SEQ #2)

T110000100001000000000000000000000 (0..10L)                   (SEQ #2)

T110010100001000000000000000000000 (0..10R)                   (SEQ #2)

T1101000001000000000000000000000000 (7..18L)                  (SEQ #2)
T1101010011010000000000000000000000 (7..18R)                  (SEQ #2)

T11100011000010110000000000000000000000 (0..12L)              (SEQ #2)
T11101111001010000010000000000000000000 (0..12R)              (SEQ #2)

T1111100110111111100101011001000000000000000000 (0..15L)      (SEQ #2)
T1111010011101111001010000100000000000000000000 (0..15R)      (SEQ #2)
```

From the above example, it may be seen that a match appears at (10 . . . 18R)SEQ#1 with (0 . . . 8R)SEQ#2 both of which correspond to the sub-fragment TATAACGTA (residues 11–19 of SEQ ID NO: 1).

As may be seen by the above example, when the attractor tokens are mapped into a numerical space, sequence-similarity characteristics are compared by evaluating the numerical distance of the coordinate values. When the attractor tokens are mapped into a Hausdorf or other similar pattern space, the tokens cause sequence-similarity characteristics to be compared by evaluating the spatial vectors.

While the example above has been given for base 7, any other base may be chosen. While choosing a different base may result in different token strings, the token strings will still be ordered next to each other with identical values for identical fragments or sub-fragments from the two (or more) fragments to be compared.

Moreover, one may generalize the notion of bases as one is not restricted to numeric bases or even alpha-numeric bases. The Numgram process is much more generally applicable to any symbol set and any abstract base to represent the symbols. For example consider the following sequence:

| Sequence A: | ♠♤ ♫♤ ☺♣♣♫☺ ♂ |
| Base A: | @ # $ % & |

One can code sequence A with base A using the Numgram procedure as follows:

Associate each unique sequence of sequence A with a base. If there are not enough terms in the chosen base, represent the number modulo the number of terms in the base. For example, there are 5 unique members of the base set representing numerals 0, 1, 2, 3, and 4. To represent the next higher number, i.e., 5, one can write #@. Alternatively, one may simply, add more elements to the base, say new element £ until there are enough members to map each symbol of Sequence A to one member of the base or unique combinations of base members.

| Sequence | ♠♤ ♫♤ ☺♣♣♫☺ ♂ |
| Base A: | @ # $ # % @ @ $ % & |

Now count the number of each base element and insert into the Numgram:

| @ | # | $ | % | & |
|---|---|---|---|---|
| % | $ | $ | $ | # |
| @ | # | % | # | @ |
| $ | $ | @ | # | @ |
| $ | # | $ | @ | @ |
| $ | # | $ | @ | @ |

The sequence is seen to converge to the behavior $#$@@. In the example used earlier, one would assign a token value of 1.

The above example using non-conventional symbols and base members is meant to illustrate the generality of the Numgram approach in producing iterative and contractive results.

Figure 1B:
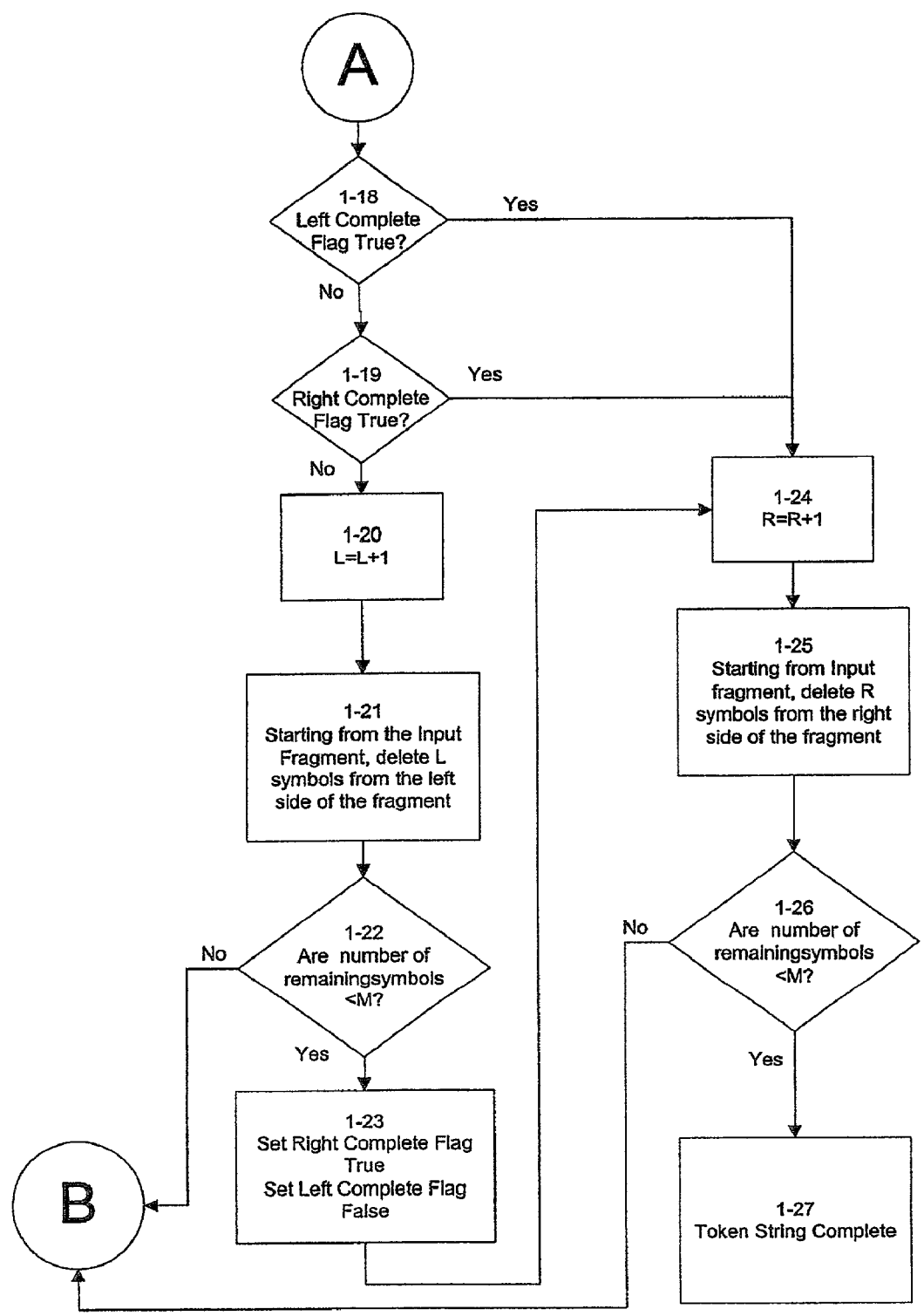

The iterative and contractive process characteristic of hierarchical multidimensional attractor space is generally described in relation to FIGS. 1a and 1b, collectively referred to as FIG. 1. In step 1-1 of FIG. 1 an input fragment is read into the system which may comprise, for example a digital computer or signal processor. More generally, the system or device may comprise any one or more of hardware, firmware and software configured to carry out the described Numgram process. Hardware elements configured as programmable logic arrays may be used. In step 1-2, index values L and R are both set to zero; the Left Complete Flag is set false; and the Right Complete Flag is set false. In step 1-3, index value n is initialized to 1. In step 1-4 the input sequence is broken up into groups, with n (in this case, initially, n=1) member in each group. This step corresponds to taking each nucleotide singly as in the examples discussed above. In step 1-5, a numeric value is assigned to each member of each group using a base 10 for example. The count value for each number is then converted into the selected base in step 1-6. In step 1-7 the Numgram procedure is performed for the fragment or sub-fragment under consideration. One recursively counts the number of elements from the preceding row and enters this counted value into the current row until a fixed behavior is observed (e.g., converging or oscillating). If the observed behavior has a cycle length of 1, the behavior is assigned a token value of "1" as performed in step 1-8. If the observed behavior has cycle length greater than 1, assign "0" as token value, and enter token into token string wiith ID of starting sequence, including L value and left/right designations.

In step 1-9, the index value is increased by one so that n=2. In step 1-10 the current value of n is compared to some fixed value, as for example, 3. If n is not greater than 3, the procedure goes again to step 1-4 where the input sequence or fragment is broken into groups with each group having 2 members. Thus, n=2 corresponds to taking the nucleotides in pairs. Steps 1-5 to 1-9 are again repeated to obtain the second token.

In step 1-9, the index value is again increased by one so that n=3. In step 1-10 the current value of n is compared to the same fixed value, as for example, 3. If n is not greater than 3, the procedure goes again to step 1-4 where the input sequence or fragment is broken into groups with each group having 3 members (codon). Thus, n=3 corresponds to taking the nucleotides in triplets. Steps 1-5 to 1-9 are again repeated to obtain the third token.

In the example of the first fragment GGATACGTCG-TATAACGTA (SEQ ID NO: 1), the token value for n=1 is 1; for n=2 is 0; and for n=3 is 1 as seen by the first three digits of (0 . . . 18L)(SEQ#1), Once step 1-10 is reached after the third time around, n>3 and the program proceeds to step 1-11 where the Left Complete Flag is checked. Since this flag was set false in step 1-2, the program proceeds to step 1-12 where one symbol is deleted from the left side of the fragment. Such deletion produces the first sub-fragment in the pyramid of Table 7 (line 1, left side), namely the sequence: GATACGTCGTATAACGTA (residues 2–19 of SEQ ID NO: 2). In step 1-13 one examines the resulting sequence to determine if there are any symbols left, and if there is a symbol left, the program proceeds to steps 1-3 where n is set to 1. By repeating steps 1-4 through 1-10 three times for n=1, 2, and 3, a Numgram token string for the current sub-fragment (line 1, left side of Table 7) may be developed corresponding to single/double/triplet member groups. This token string is seen to be "000" as shown by the 4th through 6th digits of (0 . . . 18L)(SEQ#1). The process repeats steps 1-12 to delete yet another symbol off of the left side of the sequence resulting in the second sub-fragment shown in line 2 of Table 7, left side. Again, since there is still at least one symbol present as determined in step 1-13, steps 1-4 through 1-10 are again repeated to build the additional three digits of the token string, namely, "100" as seen from the 7th through 9th digits of (0 . . . 18L)(SEQ#1). In this manner the entire token string of (0 . . . 18L)(SEQ#1) may be developed.

After all of the symbols have been used as indicated in step 1-13, the program goes to Step 1-14 where the Left Complete Flag is set true. In step 1-15, the input sequence is chopped off by one symbol from the right hand side of the fragment and the resulting sub-fragment is examined in step 1-16 to see if any symbols remain. If at least one symbol remains, the program proceeds through steps 1-3 through 1-11 where the Left Complete Flag is checked. Since this flag was set true in step 1-14, the program goes to step 1-15 where another symbol is deleted from the right hand side of the preceding sub-fragment. The sub-fragments so formed are those illustrated for example by the right hand side of the pyramid of Table 7. Each loop through 1-15 and 1-16 skips down one line in Table 7. With each line, the token string is again developed using the Numgram tables according to steps 1-3 through 1-10. As a result the token string (0 . . . 18R)(SEQ#1) is obtained.

After there are no remaining symbols as determined in step 1-16, the Left Complete Flag is set false in step 1-17, and the program goes to branch A (circle A in FIG. 1a) and to step 1-18 of FIG. 1b. In this step, the Left Complete Flag is examined and is determined to be set false (step 1-17). In step 1-19, the Right Complete Flag is examined and found to be false, as it is still set to its initial value from step 1-2. As a result, the index L is incremented in step 1-20. Since L was originally initialized to 0 in step 1-2, L is now set to 1 and, according to step 1-21, one symbol is deleted from the left side of the initial input fragment. In step 1-22 the number of sequences remaining after the symbol deletion from step 1-21 is examined. If the number of remaining symbols is not less than M, a predefined number, then the program goes to branch B (circle B) and accordingly to step 1-3 (FIG. 1a). The Numgram tables and token sequences are computed as before for both left and right pyramids starting from the fragment defined by step 1-21 (i.e., line 1 of Table 7, left hand side). Thus the token strings (1 . . . 18L)(SEQ#1) and (1 . . . 18R)(SEQ#1) are defined. After completion of these token strings, the program again loops to step 1-21 where L is incremented to L=2. Now the token strings (2 . . . 18L)(SEQ#1) and (2 . . . 18R)(SEQ#!) are tabulated and the cycle continues until the remaining symbols are less than M as determined in step 1-22. In the detail examples given for the first and second main input fragments, M is set to 7 so that sequences of 6 or less are ignored. In practice, these short sequences exhibit a constant behavior so they are not very interesting as fragment discriminates. However, in general M may be any integer set by the user to terminate the computation of the token strings.

After step 1-22 the procedure continues at step 1-23 where the Right Complete Flag is set true and the Left Complete Flag is set false. In step 1-24, the index R is incremented so that in this cycle R=1. At step 1-25 a single symbol (R=1) is deleted from the right of the input starting fragment. In step 1-26 the number of symbols is examined, and if they are not less than M, the program branches to B (circle B) and thus to step 1-3 of FIG. 1a. As before, the token strings are computed, but this time since the starting sequence was obtained by deleting one symbol from the right, the resulting token strings are (0 . . . 17L)(SEQ#!) and (0 . . . 17R)(SEQ#1). The next iteration proceeds, inter alia by steps 1-18, 1-19 and 1-24 to generate the next token string with L=2 so that token strings (0 . . . 16L)(SEQ#!) and (0 . . . 16R)(SEQ#1) are produced. This process continues until step 1-26 determines that the remaining symbols are too few to continue and then all of the token strings have been generated as in step 1-27.

While the detail example given above use the base 7 for the Numgram tables, other bases could also be used. The selection of different bases produces a different Numgram table but still produces two types of behavior, one with cycle one, and one with a cycle greater than one. For example, base 9 produces the following oscillating type of behavior:

| Oscillating Type Behavior for Base 9 | | | | | | | | |
|---|---|---|---|---|---|---|---|---|
| 0 | 1 | 2 | 3 | 4 | 5 | 6 | 7 | 8 |
| 5 | 3 | 0 | 0 | 0 | 0 | 1 | 0 | 0 |
| 6 | 1 | 0 | 1 | 0 | 1 | 0 | 0 | 0 |
| 5 | 3 | 0 | 0 | 0 | 0 | 1 | 0 | 0 |

Base 9 also produces a converging type behavior to the value: [5,2,1,0,0,1,0,0,0,]. Similar behavior occurs for different bases where the generalized statement for base n is as follows:

For single cycle behavior:

| | Number | | | | | | | |
|---|---|---|---|---|---|---|---|---|
| | 0 | 1 | 2 | 3 | . . . | n − 4 | n − 3 | n − 2 | n − 1 |
| count n − 4 | 2 | 1 | 0 | 0 | | 1 | 0 | 0 | 0 | and for multiple cycle behavior:

| | Number | | | | | | | |
|---|---|---|---|---|---|---|---|---|
| | 0 | 1 | 2 | 3 | . . . | n − 4 | n − 3 | n − 2 | n − 1 |
| count n − 4 | 3 | 0 | 0 | 0 | | 0 | 1 | 0 | 0 |
| count n − 3 | 1 | 0 | 1 | 0 | | 1 | 0 | 0 | 0 |

While the token strings would be different for different selected bases, the groupings of the token string still produces a match in that when these token strings are placed in ascending order a pair of adjacent, identical token strings appears if there is a match between the corresponding fragments. This indeed must be so, since according to property one of an attractor, there must be a consistent, fixed mapping of the same input behavior to output behavior. Thus, matching tokens strings appear adjacent one another and identify the identical sub-fragment.

The following Table shows the behavior of selected bases chosen for the Numgrams to which 10000 random inputs have been applied.

Number of each type of behavior for 10,000 random inputs

| Base | Number for behavior 0 (>cycles) | Number for behavior 1 (1 cycle) |
|---|---|---|
| 7 | 7033 | 2967 |
| 9 | 3632 | 6268 |
| 10 | 5504 | 4496 |
| 11 | 4608 | 5392 |
| 14 | 2516 | 7484 |
| 19 | 1322 | 8678 |

As seen from the above table, if one knows nothing about the input sequence, one would simply choose a base, such as base 10 or 11 so that a roughly 50/50 split will be produced for any given sequence of inputs. However, if one has some additional knowledge about the mapping of the inputs and outputs, then one may use this additional knowledge to build a more selective classifier. For example, if past experience has shown that a base 19 is appropriate of the source multiset of interest or if the symbol base can be expressed to take advantage of base 19, then a relatively high selectively will occur since 87% of the random inputs will exhibit type 1 behavior and 13% exhibit type 0 behavior. If one is looking for sequences which exhibits type 0 behavior, one can eliminate a large percentage of the input source set resulting in a highly efficient classifier. Classifying the input sequence in this manner throws out 87% of the inputs which are not of interest and greatly simplifies the segregation of the inputs to isolate the remaining 13% of interest.

Fragment assembly may be achieved by using the Numgram process described above to identify multiple overlapping fragments. The following table illustrates a matrix that may be constructed to identify overlaps.

| | Column 0 | Column 1 | Column 2 | Column 3 |
|---|---|---|---|---|
| Row 0 | 0 | 12 | 0 | 0 |
| Row 1 | 15 | 0 | 10 | 0 |
| Row 2 | 0 | 0 | 0 | 20 |
| Row 3 | 0 | 18 | 0 | 0 |

In the above table, the numbers represent the number of overlapping sequences between the fragments identified by their row and column. By convention, the overlap is taken with the "row" fragment on the left side of the overlap. Thus, fragments 2 and 3 overlap as follow with a symbol (nucleotide) length of 20 as indicated by the overlap below.

<<<<<<Fragment 2>>>>>>>>>>

<<<<<<<Fragment 3>>>>>>>>>>>>

A zero in any given cell means that there is no left-to-right overlap from the given row's fragment to the given column's fragment. The diagonal, representing fragments mapping onto themselves is always zero.

To assemble the fragments one starts with the fragment that has the fewest overlaps on its left. The fragments are chained with the longest overlap on that fragments right, the longest on the next fragment's right and so on. If the resulting chain includes all fragments, then the assembly is terminated. If not, one back's up one fragment and tries again starting with the fragment with the next-most overlaps on its right. The procedure is recursively applied to explore all possible paths. The first chain that includes all the fragments is the desired assembly. If this procedure fails to yield assembly of fragments, the longest chain found is the assembly.

While a particular implementation of an attractor process used as a classifier has been set forth above, there are many types of attractors what may be used. Attractors of interest will have the property of being one-to-one and onto so that they exhibit the primary characteristics of attractors discussed above. Note in addition that one ultimately needs an invertable process so that for any output of the attractor, one is able to get back to the original input source multiset. This invertablness is achieved by mapping the identification of the source multiset with the attractor space representation so that this latter mapping is one-to-one, onto and invertable. These characteristics will become clear from the discussion below in connection with FIGS. 2–5 below.

Figure 2A:
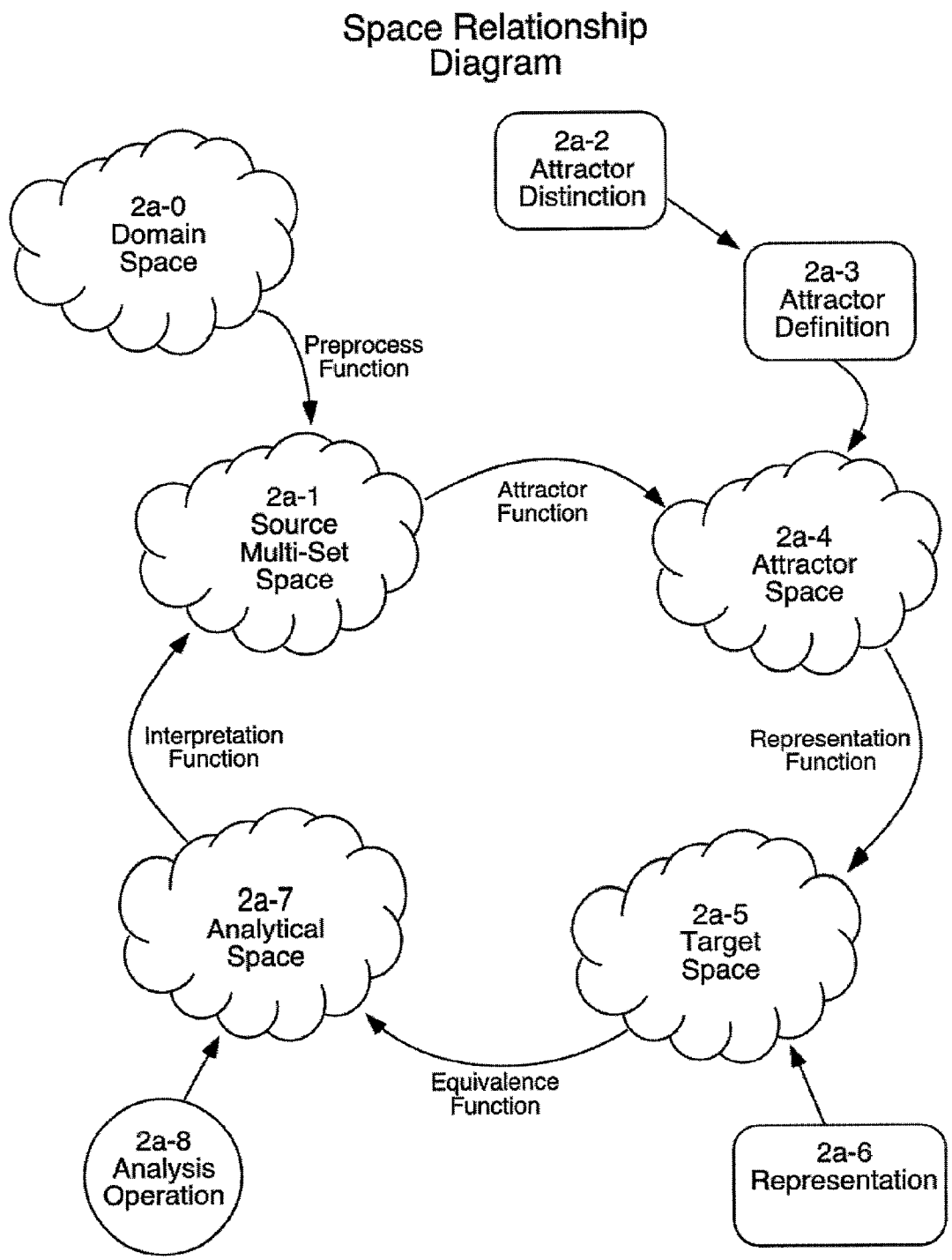
FIG. 2a is a block diagram showing the relationship of the various spaces in the attractor process.
Figure 2B:
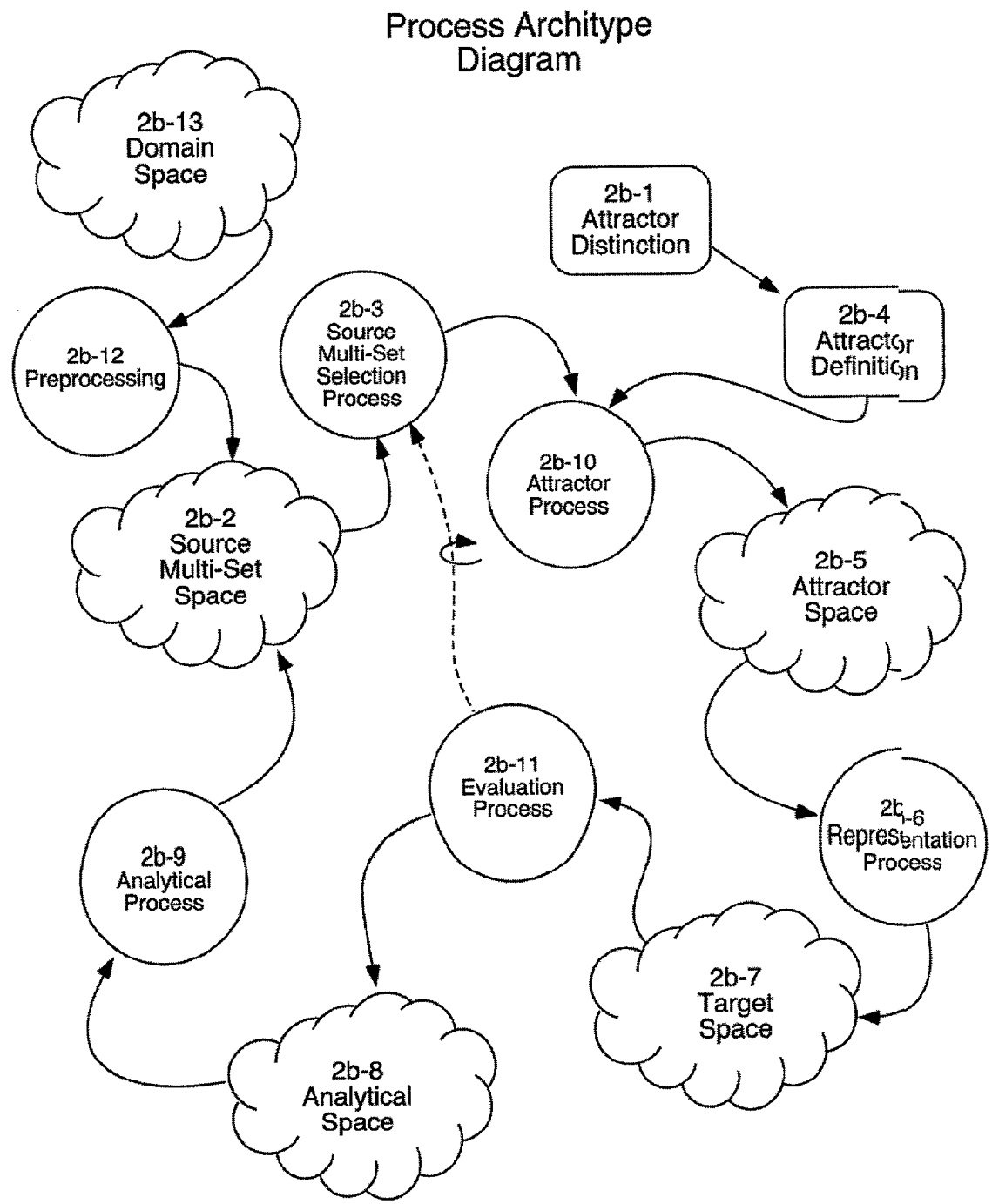

FIGS. 2a and 2b illustrate the relationships among various spaces in the atttractor process. In particular, FIG. 2a is a space relationship diagram illustrating the various spaces and the various functions and processes through which they interact.

A space is a set of elements which all adhere to a group of postulates. Typically, the elements may be a point set. The postulates are typically a mathematical structure which produces an order or a structure for the space.

A domain space block 2a-0 is provided from which a source multiset space is selected through a pre-process function. The domain space 2a-0 may be a series of pointless files that may be normalized, for example, between 0 and 1. The source multiset space is mapped to the attractor space 2a-4 via an attractor function.

An attractor process 2b-10 (shown in FIG. 2b) may be an expression of form exhibiting an iterative process that takes as input a random behavior and produces a predictable behavior. In other words, an attractor causes random inputs to be mapped to predictable output behaviors. In the above example, the predictable output behaviors may be the converging or oscillating points.

The attractor process 2b-10 may be determined by an attractor distinction 2a-2 and an attractor definition 2a-3. In the above example, the atractor distinction 2a-2 may be the selection of the Numgram, while the attractor definition 2a-3 may the selection of the base number, the symbol base, the symbols, etc.

The behaviors in the attractor space 2a-4 may be mapped to a target space 2a-5 through a representation function. The function of the target space is to structure the outputs from the attractor space for proper formatting for mapping into the analytical space. In the above example, the oscillating or converging outputs in the attractor space may be mapped to a 0 or a 1 in the target space. Further, the target space may concatenate the representation of the attractor space output for mapping to the analytical space 2a-7. The analytical space 2a-7 may be a space with a set of operators defined for their utility in comparing or evaluating the properties of multisets. Thus, evaluation of the analytical space mappings of the multisets allows such comparisons as ranking of the multisets.

In the analytical space, an analysis operation 2a-8 or an analytical process 2b-9 (FIG. 2b) may be used to evaluate the properties of the multisets.

Figure 3:
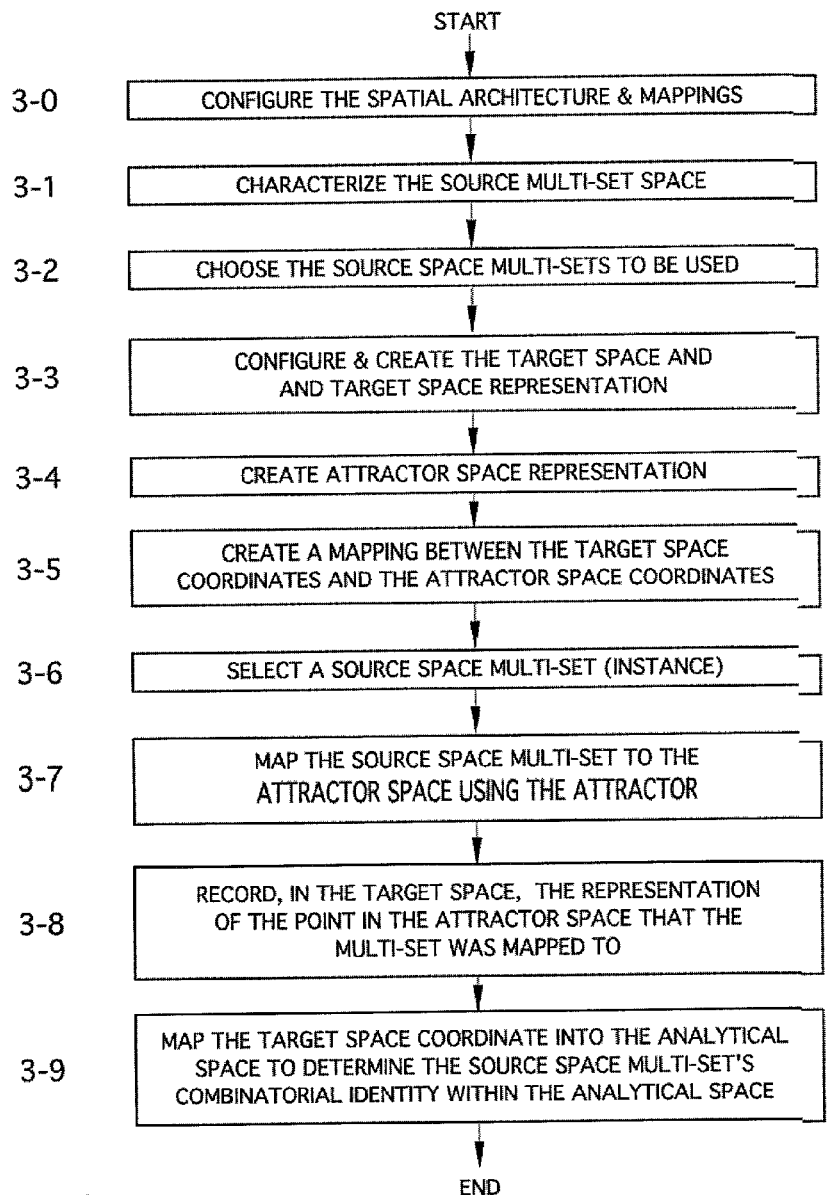
FIG. 3 is a flowchart of an embodiment of the invention for the characterization of set identities using an attractor.

An embodiment of the invention is shown in FIG. 3. The flowchart of FIG. 3 starts with step 3-0, which configures the spatial architecture and mappings according to, for example, the illustration of FIG. 2A. With the spatial architecture configured, the method according to the embodiment proceeds to the step 3-1 which is the step of characterizing the source multiset space. In this step, one looks at the size of the source multiset one desires to run through the attractor process.

It is noted here that, with reference to FIGS. 3–6b, sets are generally idempotent, i.e., do not have multiple occurrences of the same element, while multisets are generally not. Elements in multisets are, however, ordinally unique.

Turning to the DNA example by way of illustration and not by way of limitation, one may be interested in an entire set of say 10,000 fragments or only a smaller subset such as half of them, namely 5,000. If one is interested in only the 5,000 fragments, then these 5,000 fragments constitute the source multiset space. The 5,000 fragments may be selected based on some criteria or some random sampling. Clearly one could be interested in all 10,000 fragments in which case the source multiset space would be defined by the entire 10,000 set of fragments. The DNA fragments may be characterized such that one uses the fragments that are unambiguous in their symbol determination, that is in which every nucleotide is clearly determined to be one of C, T, A or G, thus avoiding the use of wild card symbols. In an image processing example, one may be interested in a full set say 11,000 images or some subset of them. The subset may be chosen, for example, based on some statistical sampling and the resulting set constitutes the sources multiset space.

In step 3-2 of FIG. 3, one chooses or defines the source multiset or multisets to be used to define the domain scope. In this step, the number of unique elements or the number of unique element groups are determined for each set of interest within a source multiset space. For example, if the sources multiset space comprises the nucleotides within any DNA fragment, then the number of unique elements needed when taking each nucleotide one at a time is 4 corresponding to C, T, A and G. However, if the nucleotides were taken as a group two elements at a time or three elements at a time, then the number of unique element groups needed to characterize the source space multiset would be 16 and 64, respectively, as shown earlier in Tables 3 and 5. In other case, the four base nucleotides may have been represented as a pairing of binary numbers using the four "symbols" for the elements such as 00, 01, 10, and 11. In both the case of C, T, A, and G and in the case of 00, 01, 10, and 11 both source multiset spaces have four distinct symbols. One may also introduce additional symbols to the source multiset space representative of a wild card "X" to represent an unrecognized nucleotide where X may stand for any one of C, T, A and G. In such case, there would be five distinct elements, and one may choose these 5 elements to be interacted with the attractor process.

In an image processing example, one may characterize a source multiset space for 8 bit gray scale images with pixel values that range from 0 to 255. Here there are a total of 256 unique values. The source multiset space may, for example, consist of 11,000 images. An image has a constant length of 65,536 (256*256) pixel values.

In the DNA example, there may be 10,000 fragments within the source multiset space, and the fragment length may vary from 200 to 2,500 nucleotides (elements) long.

More generally, the characterizing of the source multiset space and choosing the source set elements includes stating or recording what is known or discernable about the unique elements, symbols and/or unique patterns contained within, or representative of, the source multiset space. In cases where knowledge of the source space is unknown, an artificial symbol pattern or template structure can be imposed on the source space. This artificial template structure would be used for lots of different types of data such as text (different languages), graphics, waveforms, etc. and like types of data will behave similarly under the influence of the attractor process.

For definition purposes, in the DNA example, one may consider the source multiset to be a particular DNA fragment from a source multiset space which may comprise many different DNA fragments. Thus, Fragment 1 used in the detailed example above is one source multiset, and it is composed of 19 elements. In general, elements are represented by at least one symbol and typically there are a plurality of symbols which represent the elements. In the DNA example of Fragment 1, there are 4 distinct elements when the members are considered one at a time, 16 distinct element groups when the members are considered two at a time, and 64 distinct element groups when the members are considered three at a time.

Step 3-3 entails configuring the attractor and the attractor space. As discussed above with reference to FIGS. 2A and 2B, configuring the attractor involves choosing parameters to change (i.e., increase or decrease) the number of behaviors exhibited by the attractor. Some of these parameters in the case of the Numgram attractor include changing the count base, changing the symbol base or the representation of the symbol sets (going from "1", "2", to "one", "two" etc). Another parameter, as it relates to the Numgram process and the DNA example is inputting the number of distinct symbols which was determined from the choosing step step 3-2. In the Numgram process, one uses the number of distinct symbols to build the Tables 1, 3. and 5.

The attractor space contains sets of qualitative descriptions of the possibilities of the attractor results. The term "qualitative" is used to mean a unique description of the behavior of a attractor process as opposed to the quantitative number actually produced as a result of the attractor process. For example, Table 2 shows that the attractor process converges to 3211000 at row 4 of the table. In contrast, Table 4 shows a qualitatively different behavior in that the attractor process exhibits an oscillatory behavior which starts at row 5 of Table 4. Thus, the attractor space represents the set of these unique descriptors of the attractor behavior. Other qualitative descriptors may include the number of iterations exhibited in reaching a certain type of behavior (such as convergence or oscillatory behavior); the iteration length of an oscillatory behavior; the trajectory exhibited in the attractor process prior to exhibiting the fixed point behavior etc. By fixed point behavior, one means a typological fixed point behavior and thus, an oscillatory and converging behaviors in the detailed examples given above are both "fixed point" behaviors.

There are many ways to configure the attractor. For example, one could spell out "one" "two" etc. in English or French (or any representation) instead of using the numeric labels 1, 2 etc. in all of the tables (such as tables 1–7). With an appropriate change in the Numgram base, such as 26 for the English language, the attractor behavior will still result in similar mappings for similar input source sets.

Step 3-4 is the step of creating a target space representation and configuring the target space. For example, in the Numgram attractor process, one may assign token values 0 or 1 for the two fixed points corresponding to oscillatory and converging behaviors. Further one could take into account the number of iterations in the attractor process to reach the convergence or oscillatory fixed points and assign labels to the combinations of the number of iterations and the number of different fixed points. For example, if there are a maximum of 4 iterations to reach the fixed point behaviors, then there are a combination of 8 unique "behaviors" associated with the attractor process. Here, the concept of "behavior" instead of being limited to only the two fixed points, oscillatory and converging, is generalized to be understood to include the number of iterations needed to reach the fixed point. Thus, unique labels may be 1, 2, . . . 8 may be assigned to the eight types of behavior exhibited by the attractor process. Of course, a different representation may be used such as a base 2 in which case the labels 0, 1, 2, 4, 8, 16, 32 and 64 would be used as labels to represent the unique attractor behaviors. It may be appreciated that other attributes of the attractor process may be further combined to define unique behaviors such as a description of the trajectory path (string of numerical values of the Numgram process) taken in the iterations to the fixed point behaviors. The number of behaviors would then be increased to account for all the combinations of not only the oscillatory/fixed characteristics and number of iterations, but also to include the trajectory path.

Step 3-5 is the step of creating a mapping between the target space coordinates and the attractor space coordinates. The mapping may be done by making a list and storing the results. The list is simply a paired association between an identification of the target space and the attractor space using the target space representation as assigned in step 3-4. Thus, to return to the DNA example, for each DNA fragment in the sources space multiset, the mapping would consist of the listing of the identification of each fragment with the attractor space representation.

Steps 3-1 through 3-5 represent the initialization of the system. Steps 3-6 through steps 3-9 represent actually passing the source multiset through the attractor process.

In step 3-6 a source space multiset is selected from the source multiset space. By way of example and not by way of limitation, one may have a particular DNA fragment as the source multiset and one extracts the number of like elements such as the number of C's, T's, A's and G's as shown in detail above.

In step 3-7 one maps the source space multiset to the attractor space using the attractor which was configured in step 3-3. This mapping simply passes the selected source multiset from step 3-6 through the attractor process. In other words, the source multiset is interacted with the attractor process.

In step 3-8, one records, in the target space, the representation of each point in the attractor space that resulted from the mapping in step 3-7.

In step 3-9, one maps the coordinate recorded in step 3-8 into an analytic space to determine the source multiset's combinatorial identity within the analytic space. This record is a pairing or an association of a unique identification of the source multiset with the associated attractor space representation for that source multiset. The analytic space basically just contains a mapping between the original source multiset and the attractor representation.

The various spaces are delineated for purposes of clarity. It will be appreciated by those skilled in the art that, in certain implementations, two or more of the spaces may be collapsed in a single space, or that all spaces may be collapsed in a multiplicity of combinations to a minimum of two spaces, the domain space and the attractor space. For example, hierarchical spaces may be collapsed into a single space via an addressing scheme that addresses the hierarchical attributes.

By combinatorial identity, one simply means those source multisets that have the same frequency of occurrence of their elements. For example, if one is considering elements of a fragment one at a time, then the fragments ATATG and AATTG will map to the same point in the attractor space. Both of these groupings have two A's, two T's and one G, and thus when sent through the attractor process will exhibit the same behavior and be mapped to the same point in the attractor space.

Figure 4:
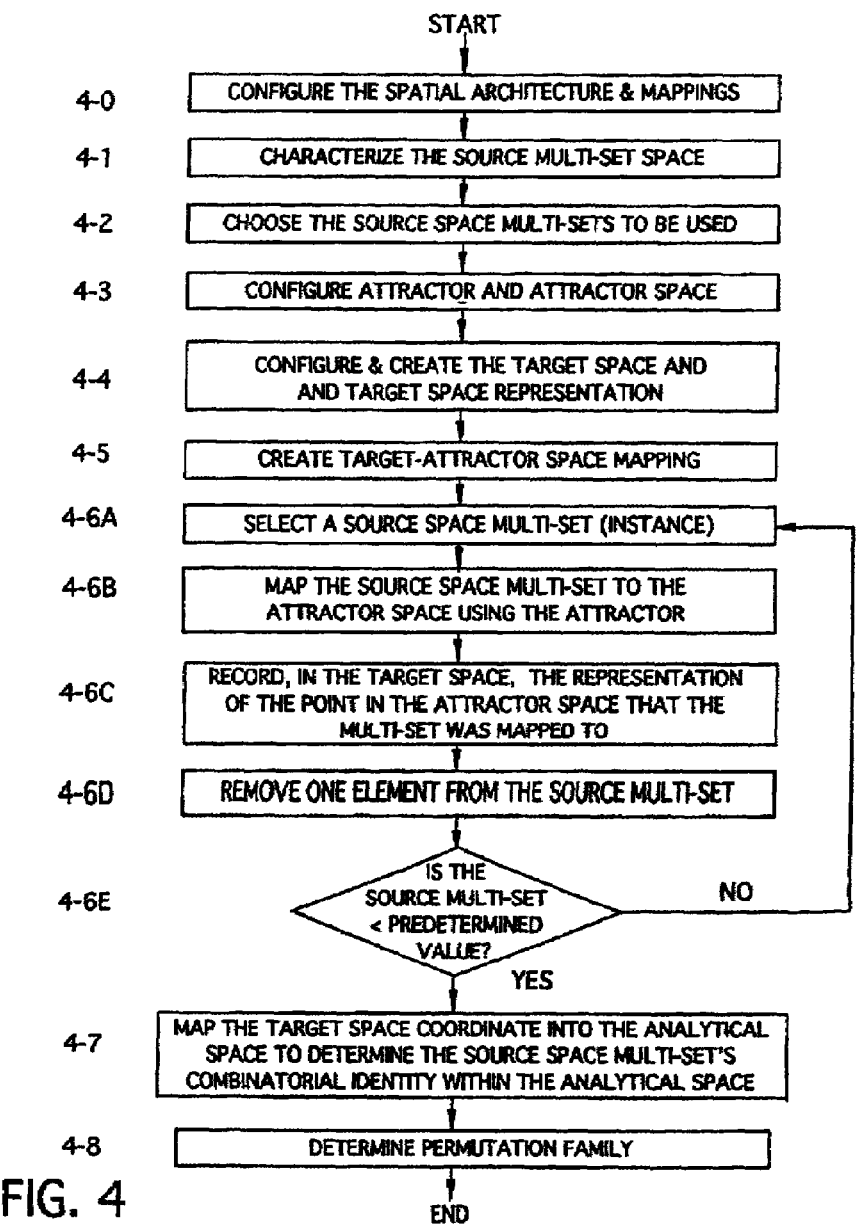
FIG. 4 is a flowchart of an embodiment of the invention for recognizing the identity of a family of permutations of a set in a space of sets containing combinations of set elements and permutations of those combinations of set element.

FIG. 4 is a flowchart representing another embodiment of the invention. This embodiment is characterized as a method for recognizing the identity of a family of permutations of a set in a space of sets containing combinations of set elements and permutations of those combinations of set elements. Step 4-1 through 4-5 are the same as steps 3-1 through 3-5. Step 4-6A through 4-6C are the same as steps 3-6 through 3-8 of FIG. 3.

Step 4-6D removes one element from the source multiset. Thus, if the source multiset is Fragment 1 in the above example, then one element is removed as explained above in detail. In general, it is not necessary to remove an element from the left or right and the elements can be removed anywhere within the source multiset. In other embodiments, one or more elements may be removed as a group. These groups may be anywhere within the sequence and may include wildcards.

In step 4-6E, one determines if the source multiset is empty, that is, one determines if there are any elements left in the source multiset. If the source multiset is not empty, the process goes to step 4-6A and repeats through step 4-6E, with additional elements being deleted. Once the source multiset is empty in step 4-6E, the process goes to step 4-7 which maps the representation coordinate list to the analytic space. The analytic space again contains the identification of the source element and its' mapped attractor space representation (i.e., a coordinated list). Since members are repeatedly removed from the source multiset, the attractor space representation will be a combined set of tokens representing the behavior of the initial source multiset and each successive sub-group formed by removing an element until there are no elements remaining.

While step 4-6E has been described as repeating until the source multiset is empty, one could alternatively repeat the iteration until the source multiset reaches some pre-determined size. In the detailed example of the DNA fragments set forth above, once the sub-fragment length is under 7, the tokens are identical and thus it is not necessary to continue the iterations.

Step 4-8 determines the permutation family of the mapped source multiset. It is noted that the permutations here are those source multisets that interacted in some common way with the attractor process as performed in steps 4-1 through 4-7. As a result of this common interaction, the token strings would be identical at least to some number of iterations as defined by step 4-6.

Figure 5:
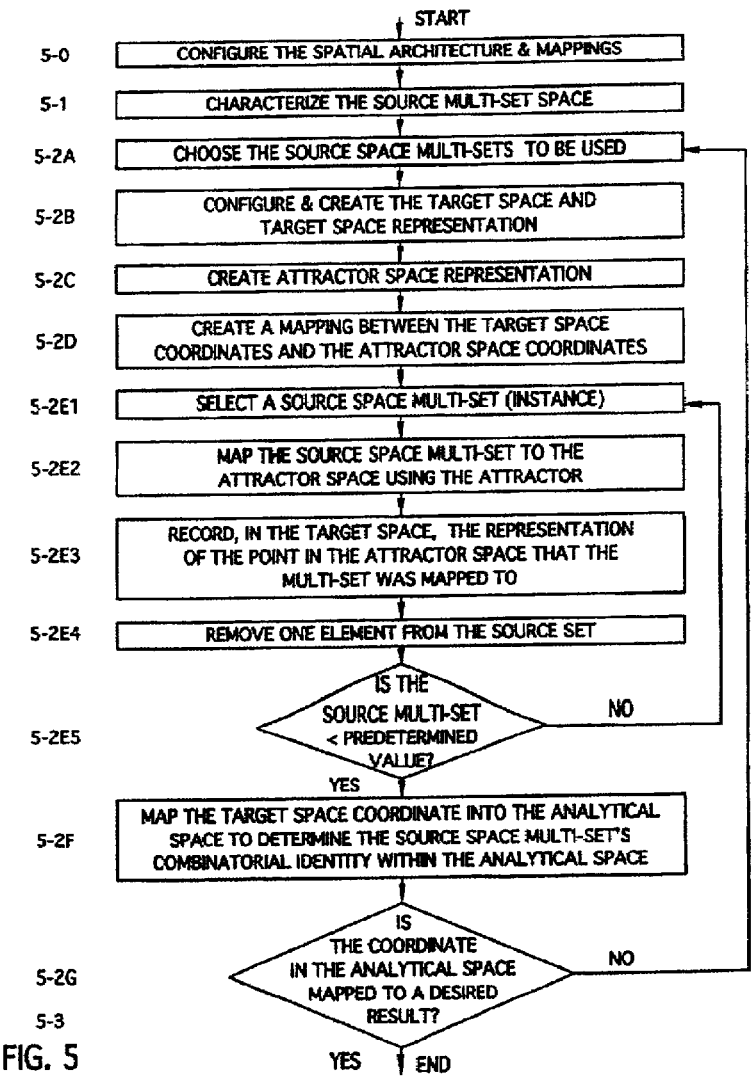
FIG. 5 is a flowchart of an embodiment of the invention for recognizing a unique set in a space of sets containing combinations of set elements or permutations of set elements.
Figure 6B:
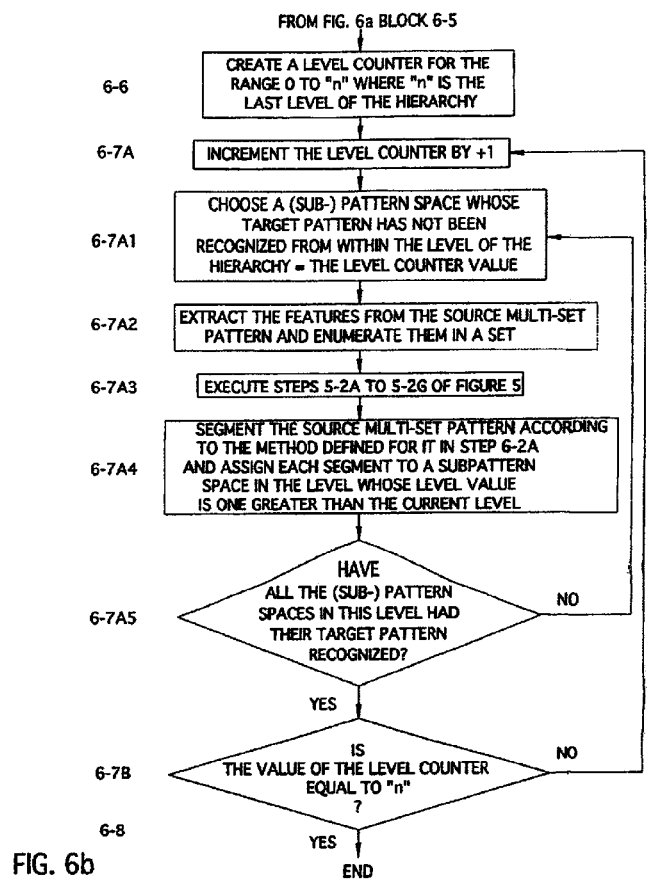

FIG. 5 illustrates yet another embodiment of the invention. In FIG. 5, steps 5-1 through 5-2F are the same as steps 4-1 through 4-7 in FIG. 4, respectively. A further step 5-2G has been added to FIG. 5 as compared to FIG. 4. in step 5-2G, one ask if the coordinate set in the source space is mapped to a unique set in the analytic space. If it is, the process ends. If there is no unique mapping, the process loops back to step 5-2A in which one chooses different source multiset elements to be used in the attractor process. For example, in the DNA example, if the attractor process of FIG. 4 did not produce a unique analytic space mapping, one may choose the elements of the source multiset two at a time and iterate steps 5-2A through 5-2G to see if a unique mapping results. In this process, it is noted that step 5-2E4 now is interpreted to mean remove one two-at-a-time element (a group of two elements taken together now forms one "element") from the source multiset. If step 5-2G still does not produce a unique mapping one again goes to step 5-2A and chooses source multiset element to be used in a different way, as for example by choosing them three at a time. Again, in step 5-2E4, one removes one "three-at-a-time" element from the source multiset on each iteration. Eventually, with the proper choice of the source multiset elements in step 5-2A and sufficient loopings from step 5-2G to 5-2A, the mapping will be unique.

FIG. 6 is a flowchart representing another embodiment of the invention. This embodiment is characterized as a method for hierarchical pattern recognition using attractor-based characterization of feature sets. This embodiment addresses a broader process than that described with reference to FIG. 5. The embodiment of FIG. 6 addresses a hierarchical pattern recognition method using, for example, the embodiment of FIG. 5 at one or more pattern spaces at each level of the hierarchy.

Steps 6-1 to 6-4 set up the problem. Steps 6-5 to 6-7B "process" source patterns into the spatial hierarchy created in Steps 6-1 to 6-4.

At the outset of the set-up portion, a hierarchy of pattern spaces is configured. In step 6-1, a top level pattern space whose coordinates are feature sets is defined. The feature set may include features or sets of features and feature relationships to be used for describing patterns, embedded patterns or fractional patterns within the pattern space hierarchy and for pattern recognition. Each feature or feature set is given a label and the Target Space is configured so that its coordinates and their labels or punctuation accurately represent the feature set descriptions of the patterns, embedded patterns and pattern fragments of the pattern space coordinates.

In step 6-2A, a method of segmenting the top-level pattern is defined. This segmenting may be pursuant to a systematic change. In the example of the DNA fragments, two-symbols-at-a-time and three-symbols-at-a-time or symbols separated by "wild card symbols" may be sub-patterns of the pattern having a series of symbols.

At step 6-2B, a set of features in the sub-patterns is defined for extraction. In the DNA fragment example, the features to be extracted may be the frequency of occurrence of each symbol or series of symbols. In other examples, such as waveforms, the features to be extracted may be maxima, minima, etc. It is noted that, at this step, the features to be extracted are only being defined. Thus, one is not concerned with the values of the features of any particular source pattern.

At step 6-2C, one or more hierarchical sub-pattern spaces may be defined into which the patterns, sub-patterns or pattern fragments described above will be mapped. This subdivision of the pattern spaces may be continued until a sufficient number of sub-pattern spaces has been created. The sufficiency is generally determined on a problem-specific basis. Generally, the number of sub-pattern spaces should be sufficiently large such that each sub-pattern space has a relatively small number of "occupants". A hierarchy of Target Subspaces is configured with a one to one relationship to the hierarchy of pattern space and subspaces.

Once it is determined that sufficient number of sub-pattern spaces exist (step 6-2D), a method of extracting each feature of the pattern space and the sub-pattern spaces is defined at step 6-3. This method serves as a set of "sensors" for "detecting" the features of a particular source pattern.

At step 6-4, the configuration of the problem is completed by defining a pattern space and a sub-pattern space hierarchy. In the hierarchy, the original pattern space is assigned the first level. Thus, a pattern space "tree" is created for organizing the sub-pattern spaces. Generally, each subsequent level in the hierarchy should contain at least as many sub-pattern spaces as the previous level. The same is true for the Target Spaces.

Once the configuration is completed, a source pattern may be selected from a set of patterns (step 6-5). The source pattern may be similar to those described above with reference to FIGS. 3–5.

At step 6-6, a counter is created for "processing" of the source pattern through each level of the hierarchy. In the embodiment illustrated in FIG. 6, the counter is initially set to zero and is incremented by one at step 6-7A to begin the loop.

At step 6-7A1, a pattern space or, once the pattern space has been segmented, a sub-pattern space is chosen for processing. At the first level, this selection is simply the pattern space defined in step 6-1B. At subsequent hierarchical levels, the selection is made from sub-pattern spaces to which the segmented source pattern is assigned, as described below with reference to step 6-7A4.

At step 6-7A2, the features from the source pattern at the selected sub-pattern space are extracted. The extraction may be performed according to the method defined in step 6-3. The features may then be enumerated according to any of several methods.

At step 6-7A3, steps 5-2A to 5-2G of FIG. 5, as described above, are executed. This execution results in a unique mapping of the source pattern to a unique set in the target set space.

At step 6-7A4, the source pattern in the selected sub-pattern space is then segmented according to the method defined in step 6-2A. Each segment of the source pattern is assigned to a sub-pattern space in the next hierarchical level.

Steps 6-7A1 to 6-7A4 are repeated until, at step 6-7A5, it is determined that each pattern space in the current hierarchical level has had its target pattern recognized. Thus, one or more sub-pattern spaces are assigned under each pattern space in the current hierarchical level.

This process described in steps 6-7A to 6-7A5 is repeated for the source pattern until the final level in the hierarchy has been reached (step 6-7B).

It is noted that, although the nested looping described between steps 6-7A and 6-7B may imply "processing" of the source pattern in a serial manner through each sub-pattern space at each level, the "processing" of the sub-pattern spaces may be independent of one another at each level and may be performed in parallel. Further, the "processing" of the sub-pattern spaces at different levels under different "parent" pattern spaces may also be performed independently and in parallel.

The present invention has been described with respect to particular embodiments thereof, and numerous modifications can be made which are within the scope of the invention as set forth in the claims.

What is claimed is:

1. A method for determining a combinatorial identity of a source set from a source multiset space, said source multiset having a plurality of elements comprising the steps of:

a) configuring a device in at least one of hardware, firmware and software to carry out an attractor process for mapping said source multiset to an attractor space, said attractor process being an iterative process which cause said plurality of elements to converge on one of at least two different behaviors defined within said attractor space as a result of said iterative process, said configuring step including inputting a characterization of the source multiset to input to said device the number of distinct elements of said source multiset;

b) using said device, executing said mapping of said plurality of elements of said source multiset to one or more coordinates of said attractor space;

c) mapping said attractor space coordinates into a target space representation, said target space representation including at least the attractor space coordinates;

d) storing the representation from said target space.

2. The method of claim 1 wherein said target space and said attractor space are collapsed onto a single space.

3. The method of claim 1 further comprising the step of:
(e) mapping said target space representation into an analytical space for evaluation to determine the source set's combinatorial identity.

4. The method of claim 3 wherein two or more of said target space, said analytic space and said attractor space are collapsed onto a single space.

5. The method of claim 1 wherein said configuring step includes counting the number of distinct elements.

6. The method of claim 5 wherein said configuring step includes choosing a number of distinct symbols for a particular grouping of said plurality of elements.

7. The method of claim 6 wherein the configuring step includes assigning symbol groups to said counted number of distinct elements and counting the number of distinct symbols within each symbol group.

8. A method for recognizing the identity of a family of permutations of a source multiset in a space of multisets containing combinations of set elements, repeat elements, and permutations of those combinations of set elements and repeat elements, said method comprising the steps of:
a) configuring a device in at least one of hardware, firmware and software to carry out an attractor process for mapping said source multiset to an attractor space, said attractor process being an iterative process which causes said plurality of elements to converge on one of at least two different behaviors defined within said attractor space as a result of said iterative process, said configuring step including inputting a characterization of the source multiset to input to said device the number of distinct elements of said source multiset;
b) using said device, executing said mapping of said plurality of elements, N, of said multiset to one or more coordinates in said attractor space;
c) mapping said attractor space coordinates as part of an accumulation of attractor space coordinates into a target space representation, said target space representation including at least the attractor space coordinates, said target space being designed to provide representational structure to the accumulation of attractor space coordinates;
d) removing one or more elements as a group from the source multiset to form a source multiset with N=N−1 element groups;
e) repeating steps b), c) and d) until N is less than a pre-determined value;
f) mapping said target space representation into an analytic space to determine the source multiset's combinatorial identity, said analytic space including at least the attractor space coordinate and an identification of said source multiset;
g) storing a representation of said analytic space.

9. The method of claim 8 further comprising the step of:
h) evaluating said stored representation of said analytic space to determine a permutation family of said source multiset.

10. The method of claim 6 wherein two or more of said target space, said analytic space and said attractor space are collapsed onto a single space.

11. The method of claim 6 wherein the pre-determined value is zero.

12. The method of claim 8 further comprising the step of:
h) determining if the source multiset representation is mapped to a unique set in said analytic space and if it is not, repeat steps a) through h) until said representation is unique and for each such repetition, inputting a different characterization of the source multiset to input to said device the number of distinct elements by grouping said elements to form distinct groups and counting each distinct group as one element.

13. A method of analytical symbol creation for describing, detecting, matching, recognizing, identifying, correlating, evaluating, analyzing, and labeling frequency, frequency distribution, waveform, signal attribute or sequence patterns, comprising:
mapping a plurality of patterns or embedded parts or fractional parts thereof or any combinations of the same from an original representation space (ORS) into a hierarchical multidimensional attractor behavior space (HMBS), to draw the patterns or embedded parts or fractional parts thereof or any combinations of the same, respectively, to a plurality of resultant attractor behaviors in the HMBS, wherein each of the resultant attractor behaviors forms an identity for a group of patterns or embedded parts or fractional parts thereof or any combinations of the same;
mapping each attractor behavior identity to a specific analytical symbol that is part of an analytical symbol scheme;
mapping said analytical symbol to create a spatial coordinate in a space, a group of spaces or a hierarchy of spaces.

14. The method of claim 13 wherein the step of mapping a plurality of patterns or embedded parts or fractional parts thereof or any combinations of the same further comprises:
repeating the step of mapping to include a plurality of portions of a predetermined pattern to create a string of analytical symbols for the pattern and respective portions;
mapping said analytical symbol string to create a series of spatial coordinates in a space, a group of spaces, or a hierarchy of spaces.

15. The method of claim 13 wherein the step of mapping a plurality of patterns or embedded parts or fractional parts thereof or any combinations of the same further comprises:
repeating the step of mapping to include a plurality of portions of a predetermined pattern to create a string of analytical symbols for the pattern and respective portions, the plurality of portions being created by removing a predetermined pattern piece from a predetermined reference location within the pattern, the predetermined pattern piece and predetermined reference location being individually selected for each portion;
mapping said analytical symbol string to create a series of spatial coordinates in a space, group of spaces or a hierarchy of spaces.

16. The method of claim 13 wherein the step of mapping a plurality of patterns or embedded parts or fractional parts thereof or any combinations of the same further comprises:
repeating the step of mapping to include a plurality of portions of a predetermined pattern to create a string of analytical symbols for the pattern and respective portions, the plurality of portions being created:
by removing a predetermined pattern piece from a predetermined reference location within the pattern,
then removing a predetermined pattern piece from a predetermined reference location within the portion previously created, then repeating the previous step at least one time, the predetermined pattern piece and predetermined reference location being individually selected for each portion;

mapping said analytical symbol string to create a series of spatial coordinates in a space, a group of spaces, or a hierarchy of spaces.

17. The method of claim 13 wherein the step of mapping a plurality of patterns or embedded parts or fractional parts thereof or any combinations of the same further comprises:

repeating the step of mapping to include a plurality of portions of a predetermined pattern to create a string of analytical symbols for the pattern and respective portions, the plurality of portions being created:

by removing a predetermined pattern piece from a predetermined reference location within the pattern, then removing the same predetermined pattern piece from the same predetermined reference location within the portion previously created, then repeating the previous step at least one time;

mapping said analytical symbol string to create a series of spatial coordinates in a space, a group of spaces, or a hierarchy of spaces.

18. The method of claim 13 wherein the space comprises a member of a plurality of spaces.

19. The method of claim 18, wherein the plurality of spaces comprises a plurality of hierarchical embedded pattern spaces.

20. The method of claim 19, wherein the embedded pattern spaces each comprise a plurality of pattern subspaces.

21. The method of claim 19, wherein the embedded pattern spaces comprise Hausdorf spaces.

22. The method of claim 19, wherein the step of mapping said analytical symbol string comprises mapping said analytical symbol string symbols to spatial vectors in the embedded pattern spaces.

23. The method of claim 22, wherein the step of comparing the sequence-similarity characteristics comprises comparing the spatial vectors of said at least two of the sequences.

24. The method of claim 18, wherein the plurality of spaces comprise a plurality of hierarchical numerical spaces.

25. The method of claim 24, wherein the step of mapping said analytical symbol string comprises mapping said string of analytical symbols to coordinate values in the numerical spaces.

26. The method of claim 25, wherein the step of comparing the sequence-similarity characteristics comprises evaluating a numerical distance of the coordinate values of said at least two of the sequences.

27. The method of claim 18, wherein the space comprises a member of a plurality of hierarchical set-theoretic spaces having a plurality of layer coordinates.

28. The method of claim 27, wherein the step of mapping said string of analytical symbols comprises mapping said string of analytical symbols to coordinate values in the layer coordinates of the set-theoretic spaces.

29. The method of claim 28, wherein the step of comparing the sequence-similarity characteristics comprises evaluating an arithmetic distance between analytical symbols or analytical symbol strings of each of the layer coordinates representing at least two of the sequences.

30. The method of claim 13, further comprising assigning a label to each of the subsequences.

31. The method of claim 30, further comprising the step of assigning a plurality of labels for a plurality of subsequences within the given sequence to a label set.

32. The method of claim 31, wherein the spaces comprises hierarchical set-theoretic spaces, further comprising assigning a plurality of label sets to a plurality of hierarchical label spaces.

33. The method of claim 32, further comprising the step of sorting the label sets into groups of predetermined content and content order in a classification space.

34. The method of claim 33, wherein the label sets are organized into branch structures, wherein the branch structures of different sequences are compared to one another.

35. The method of claim 13, wherein the patterns comprise the nucleotide sequences forming deoxyribonucleic acid (DNA) or related neuclotide composed molecules such as RNA.

36. The method of claim 13, wherein the patterns comprise waveform features forming an analog signal.

37. The method of claim 13, wherein the patterns comprise periodically recurring subpatterns whose cardinality in a second is evaluated as frequency expressed in Hertz.

38. The method of claim 13, wherein the patterns comprise amino acid sequences forming proteins or related molecules composed of amino acid sequences.

39. A method of sequence matching, comprising:

mapping a plurality of sequences from an original representation space (ORS) comprised of sequences into a hierarchical multidimensional attractor behavior space (HMBS), to draw the sequences respectively to a plurality of attractor behaviors in the HMBS, wherein each of the attractor behaviors forms a unique identity for a given group of said sequences with no overlap between different groups of sequences represented by different attractor behaviors, then mapping the attractor identity to an analytical symbol that is part of an analytical symbol scheme;

repeating the step of mapping a plurality of subsequences of a given one of the sequences to create a string of analytical symbols for the given sequence and the subsequences, the step of mapping the subsequences comprising repeatedly removing a sequence element from the first end of the given sequence, the resulting string of analytical symbols representing an exact identity of the given sequence and all of the subsequences ordered from the first end of the given sequence;

repeating the step of mapping a plurality of subsequences of a given one of the sequences to create a string of analytical symbols for the given sequence and the subsequences, the step of mapping the subsequences comprising repeatedly removing a sequence element from the second end of the given sequence, the resulting string of analytical symbols representing an exact identity of the given sequence and all of the subsequences ordered from the second end of the given sequence;

repeating the step of mapping a plurality of subsequences for each subsequence created above forming two groups of analytical symbol strings each composed of an analytical symbol sequence for the sequence and each subsequence with one group comprising those analytical symbol strings created by first end sequence element removal and the second group comprising those analytical symbol strings created by second end sequence element removal;

mapping said groups of analytical symbol strings to create a series of spatial coordinates in a hierarchy of spaces; and evaluating sequence-similarity characteristics of at least two strings of analytical symbols on from the first end of the sequence in a space, a group of spaces or a hierarchy of spaces to compare at least two of the sequences.

40. A method of sequence matching comprising:

a) mapping a first sequence having a plurality of sequence elements from an original representation space (ORS) into a multidimensional attractor behavior space (HMBS), said first sequence converging to one of at least two distinct behaviors in said attractor behavior space, wherein each behavior is assigned a unique analytical symbol from an analytical symbol scheme, such that the first sequence convergence and analytical symbol assignment is the first analytical symbol;

b) forming a plurality of subsequences of said first sequence; and c) mapping said plurality of subsequences of said first sequence to said HMBS space to create a plurality of analytical symbols corresponding to the behavior of each subsequence, said first analytical symbol and said plurality of analytical symbols defining together a first analytical symbol string uniquely characterizing said first sequence including its subsequences;

wherein the step of forming a plurality of subsequences comprising:

1) removing a sequence element from a first end of the first sequence to produce a subsequence;

2) iteratively repeating step 1) for the produced subsequence to form subsequent subsequences;

3) removing a symbol from a second end of the first sequence to produce another subsequence;

4) iteratively repeating step 3) for the produced subsequence to form subsequent other subsequences, d) ordering said first analytical symbol string to produce an ordered first analytical symbol string; and e) repeating steps a)–d) for a second sequence to obtain an ordered second analytical symbol string;

f) said first and second analytical symbol string representing an exact identity of the first and second sequences respectively and all subsequences ordered from the first and second ends of the first and second sequences; and g) comparing the ordered first analytical symbol string with the ordered second analytical symbol string whereby a match may be detected between said first sequence and said second sequence.

41. The method as recited in claim 40 wherein for each of said first and second sequences said unique analytical symbol is obtained by a composite of:

(a) taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space.

42. The method as recited in claim 41 wherein for each of said subsequences of said first and second sequences said plurality of analytical symbols is obtained by a composite of:

(a) taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space.

43. The method as recited in claim 42 wherein for each of said subsequences of said first and second sequences said plurality of analytical symbols is obtained by a composite of:

(a) taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space.

44. The method as recited in claim 41 wherein for each of said first and second sequences said unique analytical symbol string is obtained by a composite of:

(a) a taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space;

(d) removing j sequence elements, where j is an integer initially equal to one, from one end of said subsequence and, for the resulting subsequence, repeating steps a)–c);

(e) iteratively repeating step d) at least once for j=j+1 at each iteration;

(f) removing k sequence elements, where k is an integer initially equal to one, from the other end of said subsequence and, for the resulting subsequence, repeating steps a)–c); and (g) iteratively repeating step f) at least once for k=k+1 at each iteration.

45. The method as recited in claim 44 wherein for each of said subsequences, said plurality of analytical symbols is obtained by a composite of:

(a) taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space;

(d) removing j sequence elements, where j is an integer initially equal to one, from one end of said subsequence and, for the resulting subsequence, repeating steps a)–c);

(e) iteratively repeating step d) at least once for j=j+1 each iteration;

(f) removing k sequence elements, where k is an integer initially equal to one, from the other end of said subsequence and, for the resulting subsequence, repeating steps a)–c); and (g) iteratively repeating step f) at least once for k=k+1 at each iteration.

46. The method as recited in claim 45 wherein for each of said subsequences, said plurality of analytical symbols is obtained by a composite of:

(a) taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space;

(d) removing j sequence elements, where j is an integer initially equal to one, from one end of said subsequence and, for the resulting subsequence, repeating steps a)–c);

(e) iteratively repeating step d) at least once for j=j+1 at each iteration;

(f) removing k sequence elements, where k is an integer initially equal to one, from the other end of said subsequence and, for the resulting subsequence, repeating steps a)–c); and (g) iteratively repeating step f) at least once for k=k+1 at each iteration;
wherein the mapping comprises:

1.) create a row sequence list,

2.) count the number of times each sequence element occurs in the sequence,

3.) express the count for each sequence element as a number within a numerical counting base, ordered with the order of the sequence elements, 4.) create a two dimensional array (the count array) with as many columns as the number of digits in a numerical counting base (not necessarily the same as the base of the numbers in the sequence element count),
   a. count the number of times each digit in the base occurs within the group of numbers
   b. express each digit count as a number in the base entered into the respective digit column of the count array such that the sequence of numbers in a row of the array represents the number of times each digit occurred respectively,
   c. determine if the current row's sequence of numbers occurs in any preceding row of the count array,
   d. if the current row's sequence of numbers has not occurred in any previous row of the count array repeat steps a.)–d.), 5.) if the current row's sequence of numbers occurs in any preceding row, copy the sequence of rows (the row sequence) and place it in the row sequence list, 6.) determine if the current row sequence has been previously placed in the row sequence list, 7.) if the current row sequence is new, assign it an unique analytical symbol from an analytical symbol scheme and place the analytical symbol in the next position of the ordered analytical symbol string for the current sequence, 8.) if the current row sequence is not new, assign the analytical symbol for the previous occurance of the row sequence to the next position in the ordered analytical symbol sequence string and erase the current row sequence from the list.

47. The method as recited in claim 45 wherein for each of said subsequences, said plurality of analytical symbols is obtained by a composite of:

(a) taking said sequence elements one at a time forming analytical sequence elements and, collectively, an analytical sequence and mapping the analytical sequence to said attractor space;

(b) taking said sequence elements two at a time at a time forming analytical sequence elements and, collectively, an analytical sequence and mapping the analytical sequence to said attractor space;

(c) taking said sequence elements three at a time forming analytical sequence elements and, collectively, an analytical sequence and mapping the analytical sequence to said attractor space;

(d) removing j sequence elements, where j is an integer initially equal to one, from one end of said subsequence and, for the resulting subsequence, repeating steps a)–c);

(e) iteratively repeating step d) at least once for j=j+1 at each iteration;

(f) removing k sequence elements, where k is an integer initially equal to one, from the other end of said subsequence and, for the resulting subsequence, repeating steps a)–c); and (g) iteratively repeating step f) at least once for k=k+1 at each iteration;
wherein the mapping comprises:

9.) create a row sequence list,

10.) count the number of times each sequence element occurs in the sequence,

11.) express the count for each sequence element in a non-numerical form, ordered with the order of the sequence elements, 12.) create a two dimensional array (the count array) with as many columns as the base number of count symbols in said non-numerical form
   a. count the number of times each count symbol occurs within the group of numbers
   b. express each count symbol count in said non-numerical form entered into the respective count symbol column of the count array such that the sequence of count symbols in a row of the array represents the number of times each digit occurred respectively,
   c. determine if the current row's sequence of count symbols occurs in any preceding row of the count array, d. if the current row's sequence of count symbols has not occurred in any previous row of the count array repeat steps a.)–d.),
13.) if the current row's sequence of count symbols occurs in any preceding row, copy the sequence of rows (the row sequence) and place it in the row sequence list,
14.) determine if the current row sequence has been previously placed in the row sequence list,
15.) if the current row sequence is new, assign it an unique analytical symbol from an analytical symbol scheme and place the analytical symbol in the next position of the ordered analytical symbol string for the current sequence,
16.) if the current row sequence is not new, assign the analytical symbol for the previous occurance of the row sequence to the next position in the ordered analytical symbol sequence string and erase the current row sequence from the list.

\* \* \* \* \*